Dec. 6, 1955  C. L. TANSEL  2,725,803
PHOTOGRAPHIC COMPOSING APPARATUS
Filed June 7, 1947  8 Sheets-Sheet 1
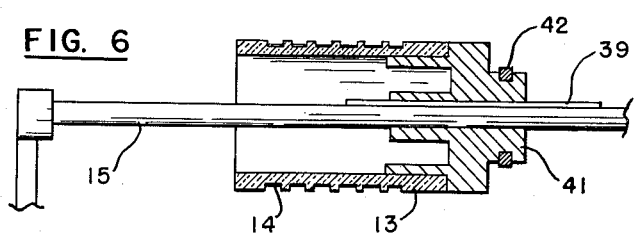
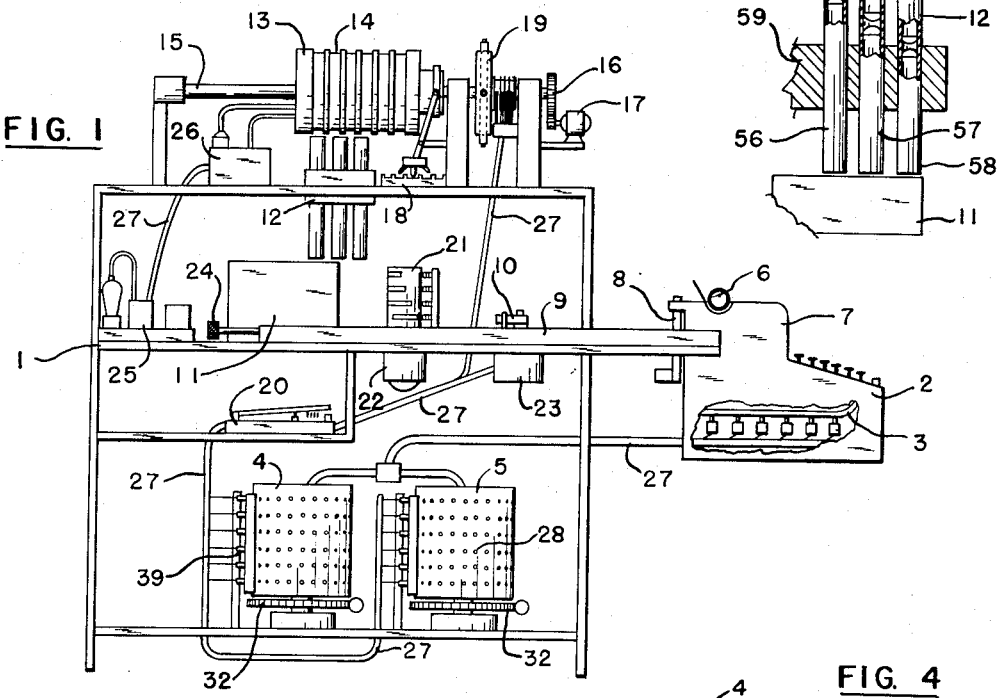
INVENTOR.
CECIL L. TANSEL
BY Cecil Babcock.

Dec. 6, 1955 C. L. TANSEL 2,725,803
PHOTOGRAPHIC COMPOSING APPARATUS
Filed June 7, 1947 8 Sheets-Sheet 2
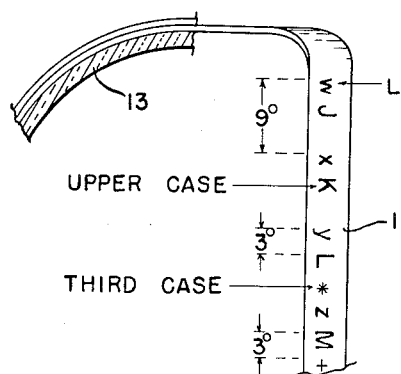
FIG. 10
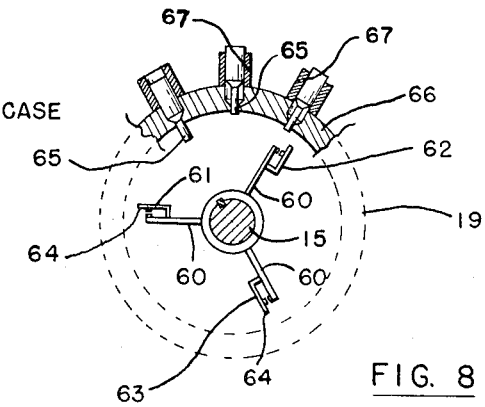
FIG. 8
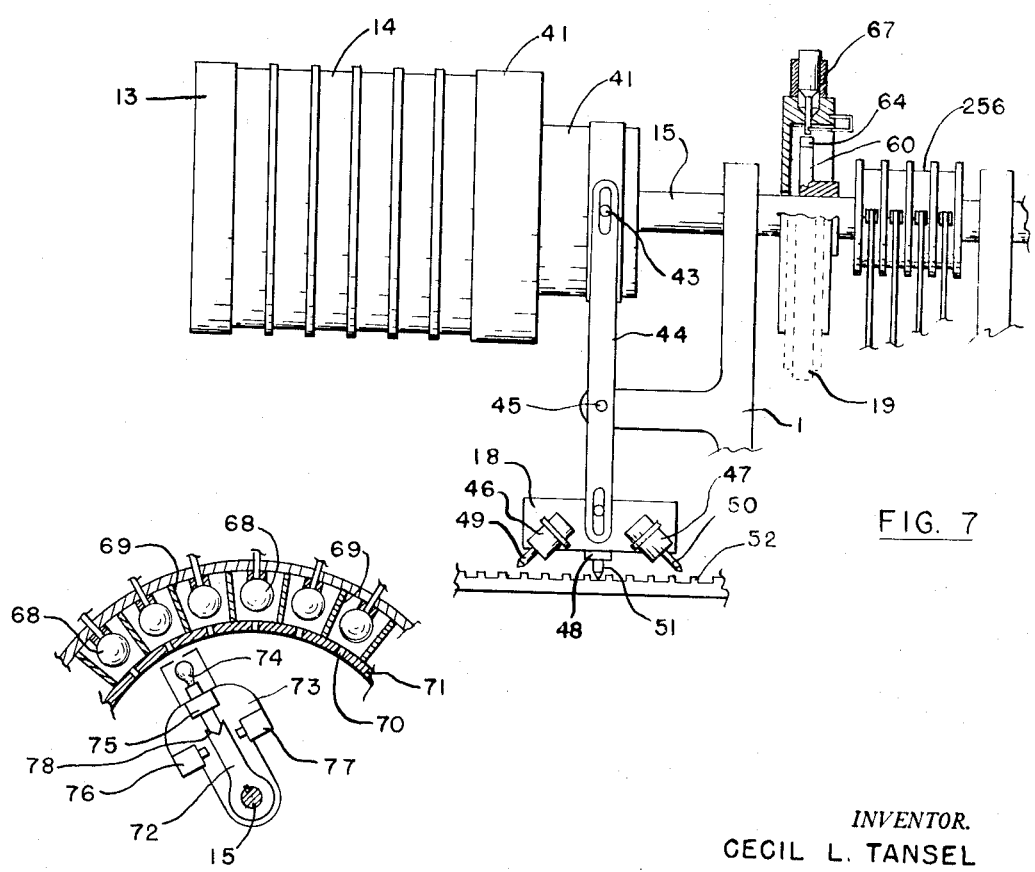
FIG. 7
FIG. 9
INVENTOR.
CECIL L. TANSEL
BY Cecil Babcock Dec. 6, 1955  C. L. TANSEL  2,725,803
PHOTOGRAPHIC COMPOSING APPARATUS
Filed June 7, 1947  8 Sheets-Sheet 3
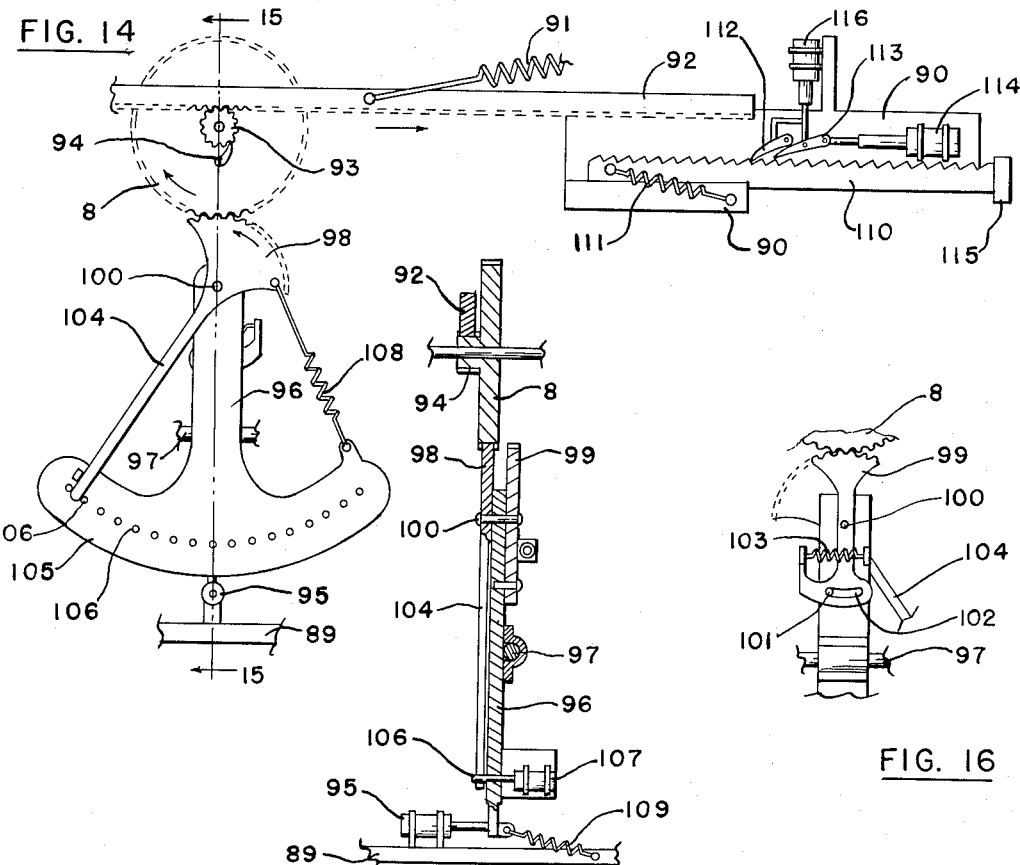
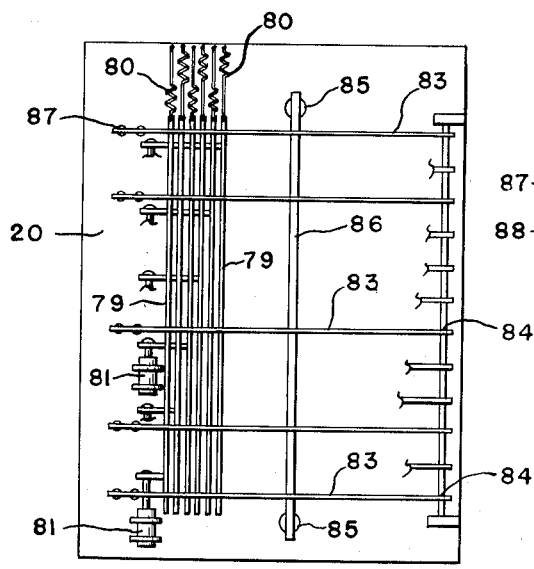
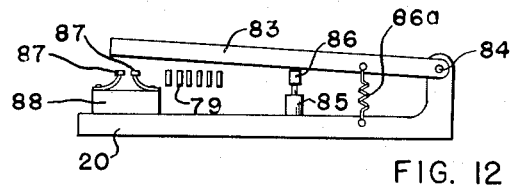
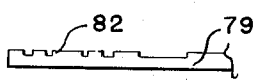
INVENTOR.
CECIL L. TANSEL
BY Earl Babcock Dec. 6, 1955  C. L. TANSEL  2,725,803
PHOTOGRAPHIC COMPOSING APPARATUS
Filed June 7, 1947  8 Sheets-Sheet 4
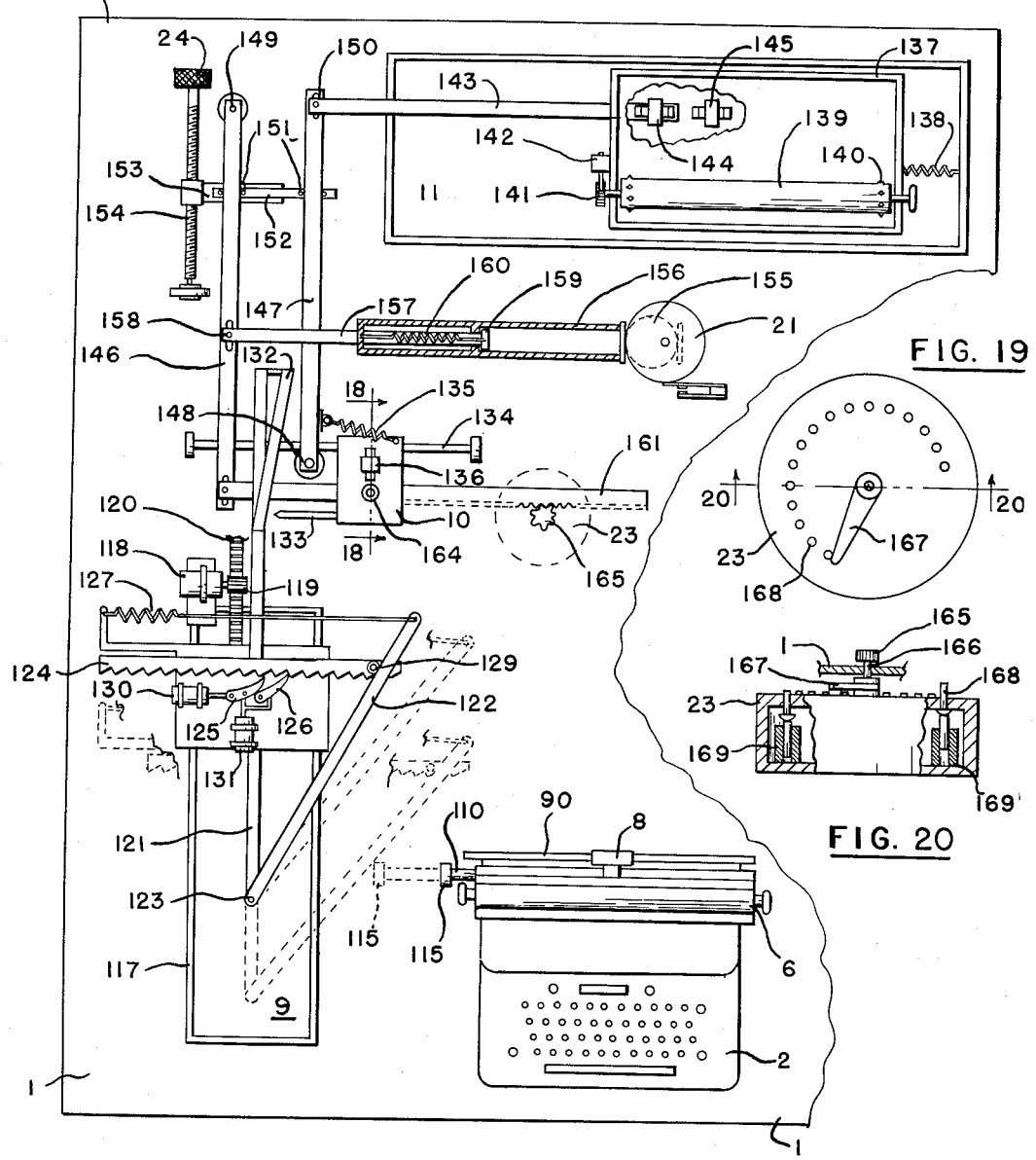
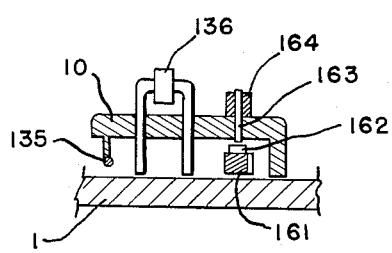
INVENTOR.
CECIL L. TANSEL
BY Earl Babcock

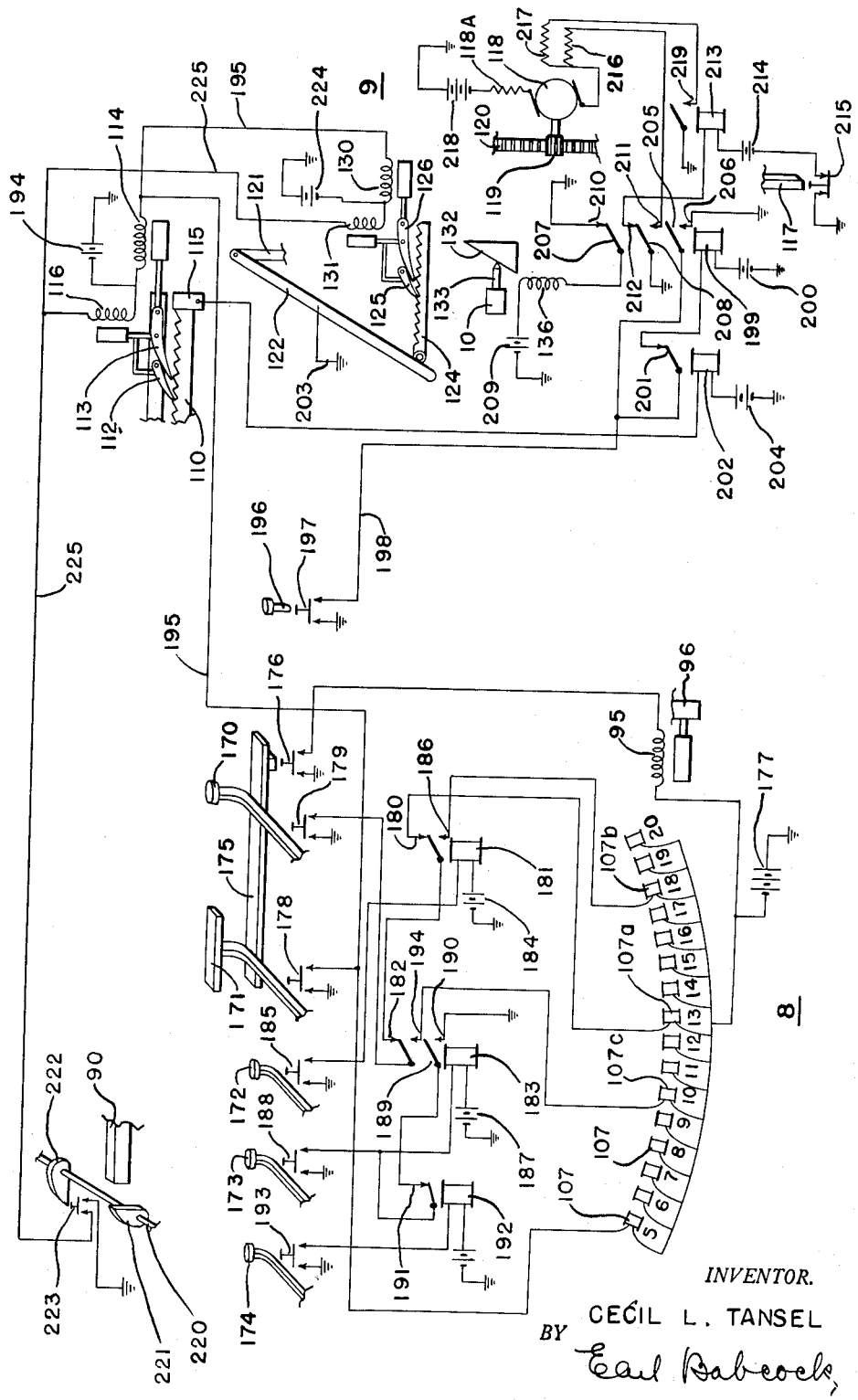

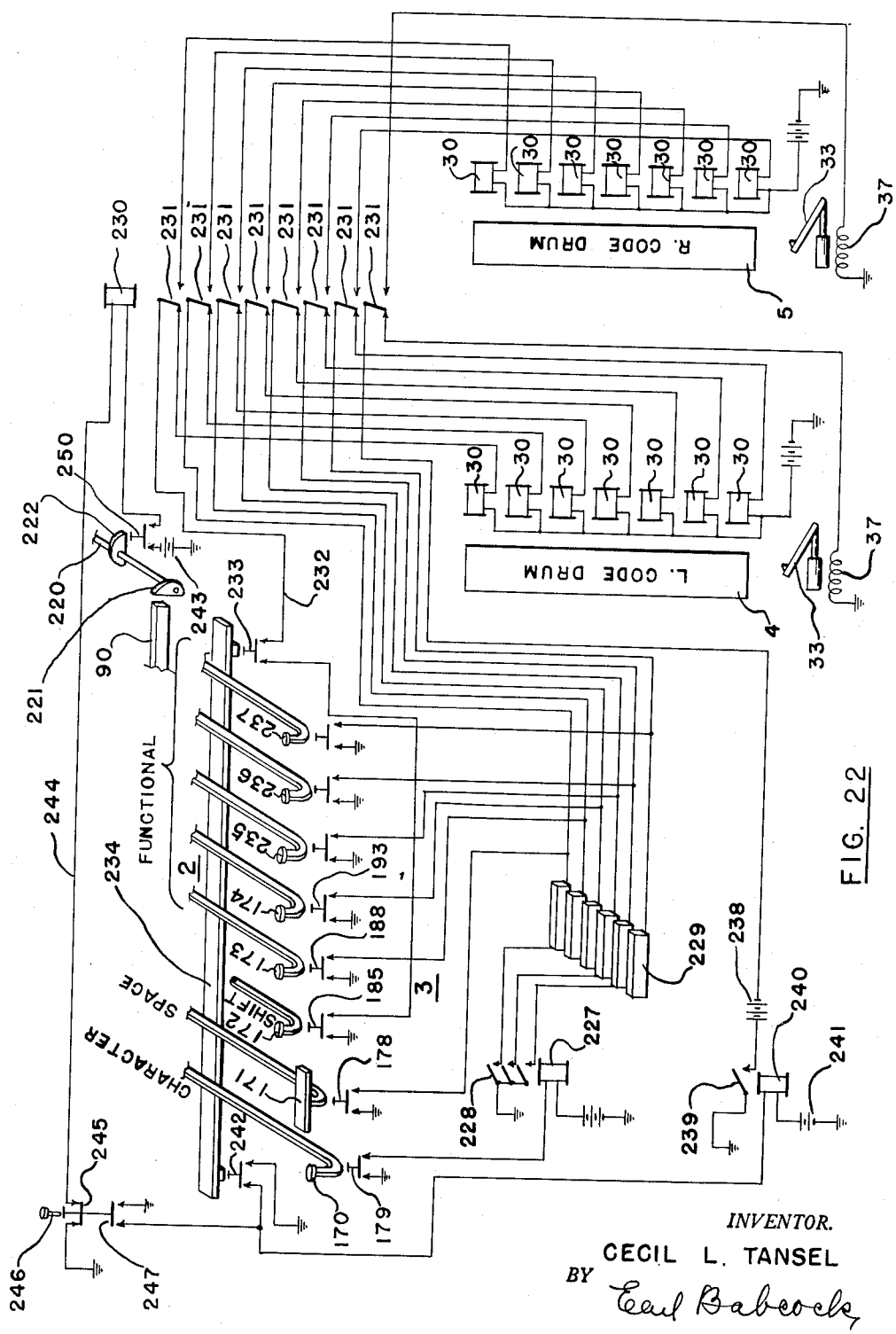

Dec. 6, 1955  C. L. TANSEL  2,725,803
PHOTOGRAPHIC COMPOSING APPARATUS
Filed June 7, 1947  8 Sheets-Sheet 8
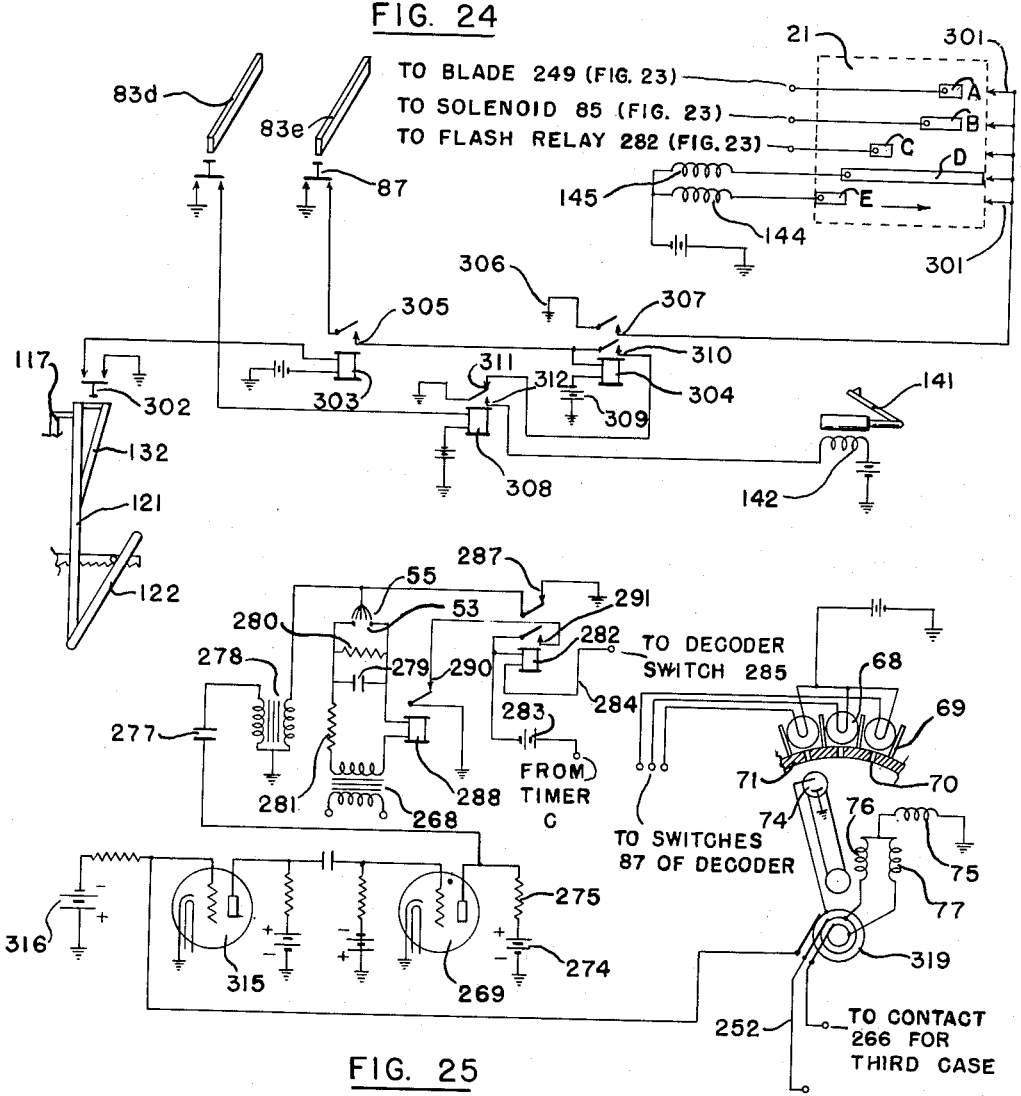
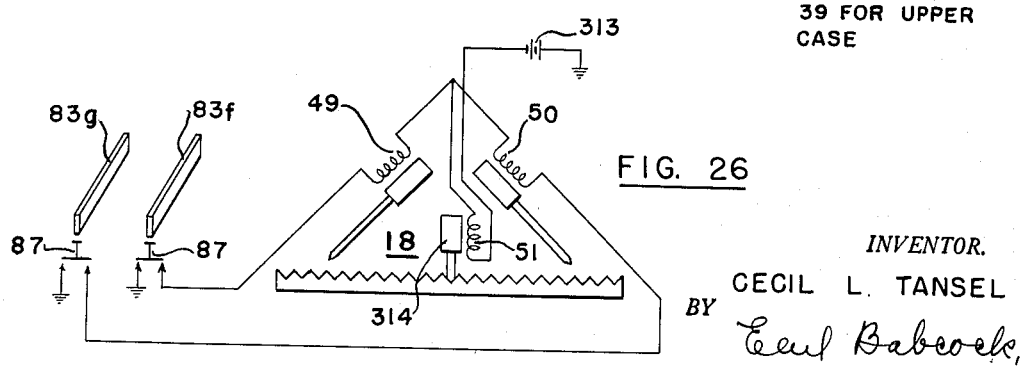
INVENTOR.
CECIL L. TANSEL
BY Cecil Babcock

United States Patent Office 2,725,803
Patented Dec. 6, 1955

2,725,803

PHOTOGRAPHIC COMPOSING APPARATUS

Cecil L. Tansel, Duncan, Okla.

Application June 7, 1947, Serial No. 753,273

6 Claims. (Cl. 95—4.5)

This invention relates to apparatus for photographic printing and more particularly to apparatus for preparing photographic copy for reproduction in photolithographic printing presses or the like.

At the present time, the very best printing is done by offset lithographic processes. One way of preparing photographic copy for use in this work consists in setting up lines of type either by hand or with a Linotype or Monotype machine. These lines are then photographed. Since the lines of type are justified, the photographic reproduction of them on film is also justified. A high degree of perfection is obtained in using film thus obtained in lithographic work.

However, there are certain inherent limitations in the known ways of preparing photographic copy. Linotype and Monotype machines cannot commonly be used to advantage if the type is larger than 18-point (Great Primer). Setting type by hand is expensive and time-consuming. Furthermore, even when the type to be photographed is set by a machine, considerable time and expense are involved. It has long been recognized that an ideal system would be one in which a compositor could merely sit down to a machine and cause it to deliver copy photographed directly from a stencil of master characters, as fast as keys on a keyboard can be struck, in any of various fonts of type and in any desired size, with all of the lines being justified and with the characters so spaced or "sized" that a perfect page is obtained.

In accordance with the present invention it is proposed to attain this high degree of perfection and practically universal application in a photographic machine which, while rather complicated because of the number of parts necessarily employed, can be made relatively inexpensively, most of the mechanical parts being capable of manufacture by stamping and the electrical parts being assembled from standard equipment now on the market.

Fundamentally, the system of the present invention contains provision for making a temporary record, in code, of the sequence of characters and spaces struck upon a keyboard, until a sufficient number have been struck to fill a line or measure, and then causing this temporary record to control the photographing upon a light-sensitive film, of characters in the reverse order or sequence, with the spaces adjusted to obtain a justified line. Were it not necessary that a justified line be obtained, the temporary record of sequence would be unnecessary, since the characters could be photographed at once. Because a justified line is required, however, the temporary record is employed to enable the justification mechanism of the present invention to function. Obviously the line must be composed before it can be justified.

An important part of the present invention is the justification mechanism. It functions to count and add the widths of the characters which are to be employed in a given line of composition (it being understood that these characters are of varying width in most print fonts, as distinguished from the uniform spacing of letters on an ordinary typewriter). This sum of the widths of characters is automatically subtracted by the justification mechanism from the total width of the line or measure to be printed. This difference, or total space to be justified, is then automatically divided by the number of times the space bar of the keyboard has been struck in composing the line and a stop for the photographic film carriage is set accordingly. Thus when the photographing of characters takes place, under the control of the temporary record of sequence, all of the spaces between words will be uniform and a justified line will be obtained.

Another advantage results from the use of a temporary record of character sequence. An ordinary typewriter platen may be provided in connection with the keyboard and each line typed thereon as the temporary record is made. The compositor can then see if an error has been made and if so cancel the line before any part of it is used to control the making of the photographic or permanent record. If desired, the type used to make the impression on the platen may be that which is ordinarily used in printing, rather than that ordinarily used on a typewriter, and the escapement on the platen carriage may be such that the carriage advances in accordance with the various widths of the characters. In the preferred embodiment of the invention described hereinafter, such mechanism is shown and described, although it is to be understood that the invention is capable of use with an ordinary typewriter escapement in conjunction with the type ordinarily used on a typewriter, or, in fact, without any typewriter platen at all.

Accordingly, it is one of the objects of the present invention to devise an apparatus for photographic printing in which a temporary record is made of the sequence of characters and spaces necessary to fill a line or measure and in which this temporary record is then employed to control the photographing of characters from a master stencil upon a light sensitive film in such a way as to provide a justified line, the photographing taking place rapidly and accurately and providing a page of copy of absolute fidelity and high precision.

It is a further object of the invention to devise a simple justification mechanism in which the width or size of various characters is added, the sum subtracted from the total width of a given line or measure and the difference divided by the number of spaces in the line so that a stop is set accordingly.

It is a further object of the invention to devise a novel and practical coding system for making a temporary record of character sequence struck upon a keyboard, together with a novel system for printing characters under the control of that temporary record.

It is a further object of the invention to devise a system for exposing film rapidly and accurately to print characters thereon under the control of a record of character sequence and to advance the film, after the printing of each character thereon in proportion to the width or size of that character.

Another object of the invention is to devise a novel font selector mechanism for photographic printing wherein a wide variation in fonts may be subject to the control of a compositor and selected as desired with a minimum of waiting and a minimum of manipulation of mechanism.

Still another object of the invention is to devise a novel system employing lenses of different focal length and employing pantograph mechanism in connection with a film carriage for enlarging or reducing the size of characters on a film as they are photographed.

Still another object of the invention is to devise rapid photographic means and novel means for selecting for photographing any one character from one of three cases of a given font of type, the font being in the form of a master stencil rotated at sufficient speed to enable the selection to take place rapidly.

Other objects and advantages reside in certain novel features of the apparatus as will be more apparent from the following description of the invention, taken in connection with the accompanying drawings, in which:

Fig. 1 is a view in side elevation of apparatus constructed in accordance with the invention and showing the general assembly, a part being cut away for purposes of illustration;

Fig. 2 is a transverse cross section of one of the code drums of Fig. 1, the view being taken on the line 2—2 of Fig. 1;

Fig. 3 is a view of a fragment of the code drum of Fig. 2 illustrating the manner in which the pins are mounted in the code drum;

Fig. 4 is a fragmentary cross-sectional view of the portion of the code drum shown in Fig. 3;

Fig. 5 is a fragmentary view, partly in cross section, of the light and optical system used for printing in the apparatus of Fig. 1;

Fig. 6 is a transverse cross-sectional view of the font drum of the apparatus of Fig. 1;

Fig. 7 is an enlarged fragmentary side view of the font drum and character selector of the apparatus of Fig. 1;

Fig. 8 is a cross-sectional view of the character selector of Fig. 7;

Fig. 9 is a cross-sectional view of a different embodiment of character selector suitable for use in the apparatus of Figs. 1 and 7;

Fig. 10 is a fragmentary cross-sectional view of the font drum illustrating the manner of mounting the stencils thereon;

Fig. 11 is a plan view of the decoding device of Fig. 1;

Fig. 12 is a cross-sectional view of a portion of the decoding device of Fig. 11;

Fig. 13 is a side view of one of the ward bars of the decoding device of Fig. 11;

Fig. 14 is a fragmentary side view of escapement mechanism suitable for controlling movement of a typewriter carriage associated with the keyboard of the apparatus of Fig. 1;

Fig. 15 is a vertical cross-sectional view of a portion of the mechanism of Fig. 14;

Fig. 16 is a rear view of a fragmentary portion of the mechanism of Fig. 14;

Fig. 17 is a plan view of the keyboard, justification mechanism, pantograph and film carriage of the apparatus of Fig. 1;

Fig. 18 is a cross-sectional view of the sizing mechanism which controls movement of the film carriage in accordance with the setting of the justification mechanism of Fig. 17;

Fig. 19 is a plan view of the mechanism of Fig. 17 for controlling the advance of the film carriage as characters are being printed on the film;

Fig. 20 is a cross-sectional view of the mechanism of Fig. 19, the view being taken on the line 20—20 thereof;

Fig. 21 is a circuit diagram of the electrical apparatus of Fig. 1 used for justification;

Fig. 22 is a circuit diagram of the electrical apparatus of Fig. 1 for recording on the code drums the sequence with which characters on the keyboard are struck and for recording on the code drums certain functional operations of the apparatus of Fig. 1;

Fig. 24 is a circuit diagram of the electrical apparatus of Fig. 1 used to control the starting of the printing of a line or measure on the film, the stopping of the printing at the end of the line or measure, and the timer circuits;

Fig. 25 is a circuit diagram of the modification of character selector shown in Fig. 9, the circuit diagram illustrating the connections between this character selector and the flashing device;

Fig. 26 is a circuit diagram of the electrical font selector used in the apparatus of Fig. 1.

Figure 23:
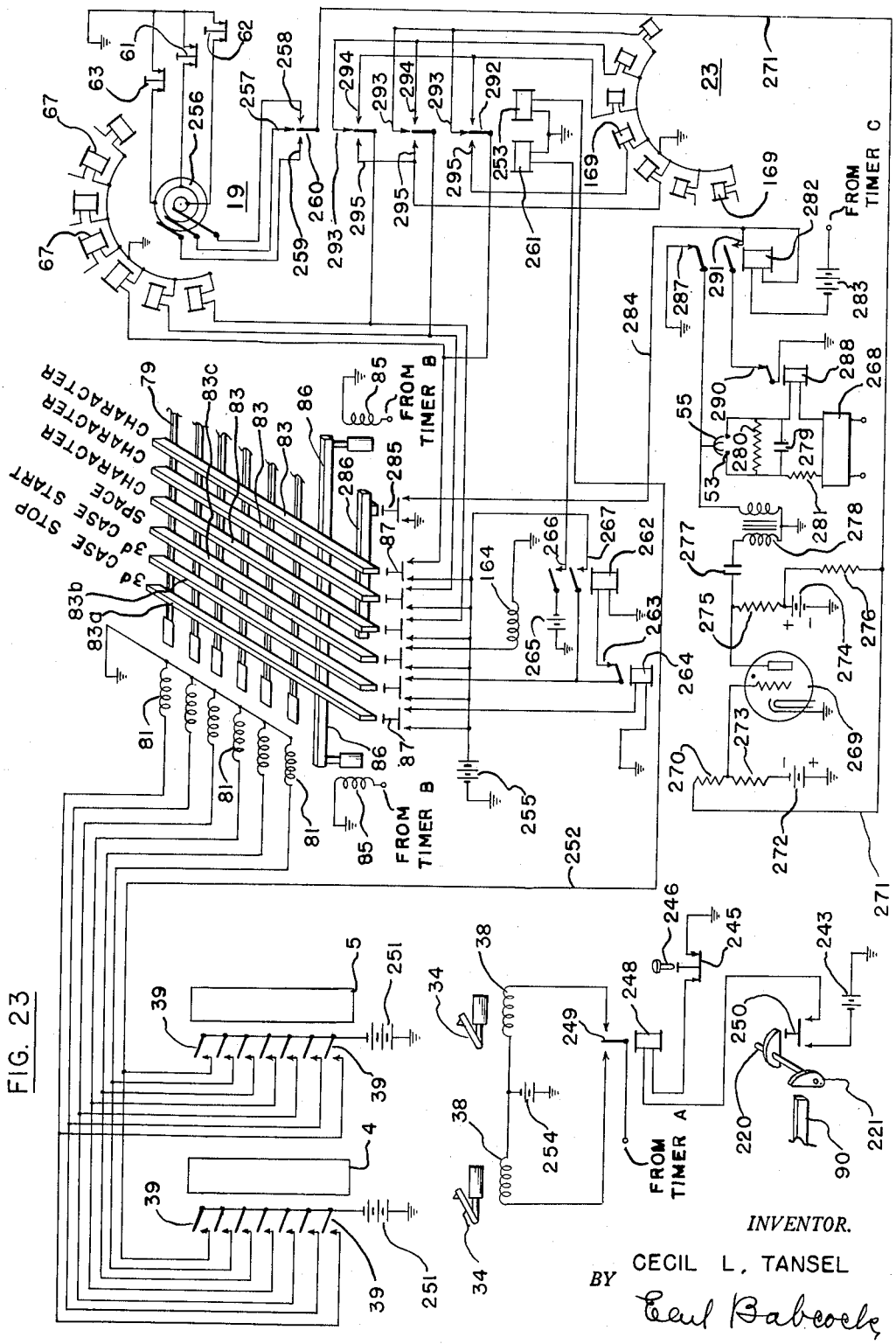
Fig. 23 is a circuit diagram of the electrical apparatus of Fig. 1 used for decoding the signals on the code drums together with the electrical circuits used for the selection of characters for advancing or sizing the film carriage during the printing of characters thereon and for causing a flash of light to print the characters on the film.

This application is a continuation in part of my co-pending application Serial No. 604,474, filed July 11, 1945, for Photo Composing Apparatus, now abandoned.

Referring first to the general assembly of the apparatus shown in Fig. 1, it will be seen that the apparatus includes a frame or table 1 to which the other parts are secured. In general, the apparatus is of two parts, one for recording signals of characters and the other for decoding the signals and printing characters accordingly.

Essentially, the recording system includes a suitable keyboard of characters designated at 2 and an electrical switching arrangement shown generally at 3, for closing electrical circuits which, among other things, control the recording alternately upon the code recording drums 4 and 5 of the sequence with which the characters on the keyboard are struck. Associated with the keyboard is a typewriter platen 6 upon which paper may be mounted so that the compositor can visualize what is being recorded on the code drums while he is operating the keyboard. At the rear of the typewriter assembly 7 there is a mechanism 8 which controls the advance of the platen 6 as characters are being typed thereon, this apparatus being generally referred to as "typewriter sizing mechanism." In addition to causing the typewriter carriage to advance as characters are typed on the platen 6, the mechanism 8 is used to regulate or control the justification mechanism shown generally at 9. The typewriter sizing mechanism 8 preferably advances the paper carriage or platen 6 different amounts depending upon which characters of the keyboard are struck rather than advancing it uniformly the way an ordinary typewriter does.

After signals have been recorded in code upon one of the drums, the second part of the apparatus decodes the signals and causes them to control the printing of characters upon a light-sensitive film mounted on a suitable carriage. The justification mechanism 9 controls the setting of a stop mechanism 10 which in turn controls movement of a film carriage during the printing operations to advance it a justified space when no character is being printed, as, for example, the space in between two words.

The film upon which the characters are printed is contained within a lightproof box shown generally at 11 in Fig. 1. Above this box 11 is an optical system 12 which is adapted to transmit light from a flashing device located inside of a rotating carrier or font drum 13. The font drum is provided with a number of master stencils 14 of different fonts of characters, each arranged in a circle and each font preferably being provided with three cases. The font drum is mounted upon and splined to a shaft 15 driven through a suitable gear train 16 by an electrical motor 17. It is rotated continuously during the operation of the machine about the axis of the circles of characters. For selecting which font of type is to be brought into juxtaposition with the optical system 12, mechanism is provided as shown generally at 18 for moving the font drum step by step along the shaft 15 to which it is splined.

The flashing mechanism within the font drum is designed to cause a brilliant light of extremely short duration to pass through the transparent stencil 14 of the particular font selected to be conveyed by the optical system 12 into the box 11 to expose film therein when a certain character to be printed has been selected, this action taking place while the font drum is continuously rotated at a sufficiently high speed to enable the printing of five or six hundred characters per minute. Thus the light source illuminates by flash one character at a time. The printing on the film is accomplished by imparting thereto a latent image of each character illuminated on the carrier. To select which character is to be printed and also to select which case is to be employed, a character selector 19 is provided, this selector functioning as explained hereinafter, under the control of decoding device 20 (shown in detail in Figs. 11, 12 and 13) operated under the regulation of a timer 21 driven by an electrical motor 22 which causes the signals recorded upon one or the other of the code recording devices or drums 4 or 5 to actuate the decoding device 20 in the desired sequence.

Since the fonts of type usually used in printing have characters of many different widths or sizes, it is necessary to provide means for advancing the film carriage varying amounts as the characters are printed on the film. Mechanism for controlling this movement, referred to hereinafter as "film sizing mechanism," is shown in Fig. 1 at 23. It is connected electrically to the decoding mechanism 20. The mechanism 23 is connected mechanically through suitable pantograph apparatus (shown in Fig. 17) to the film carriage within the box 11. This pantograph apparatus may be adjusted by means of a knob 24 outside the box 11 to vary the ratio of movement of the film sizing mechanism to the movement of the carriage.

Also generally shown in Fig. 1 is some of the electrical equipment used in connection with the flashing device, this being designated 25 and 26. Electrical cables for transmitting current between the various parts are shown at 27.

Details of the construction of the code devices 4 and 5 are shown in Figs. 2, 3 and 4. Since these drums are alike, only the drum 4 will be described in detail. It will be seen that the cylinder or drum, per se, is provided with seven rows or circles of perforations in which pins 28 are mounted for limited radial movement. The pins 28 are held frictionally by a small piano wire 28a woven around them as shown particularly in Figs. 3 and 4. When the drum 4 is rotated in a clockwise direction as viewed in Fig. 2, a small roller 29 mounted on the outside thereof pushes all the pins 28 inwardly until they are flush with the exterior of the drum, this being their normal or inoperative position.

When signals are recorded or "coded" upon the drum in accordance with the striking of the keys of the keyboard 2 of Fig. 1, certain of the pins 28 are moved outwardly into an "operative" position. This movement is brought about by seven solenoids, one for each row of pins 28, mounted vertically inside the drum 4. One of these solenoids is shown at 30 in Fig. 2. It will be understood that when a solenoid 30 is energized, its armature 31 is caused to strike the head of a pin 28 and force that pin outwardly. Thus if the drum 4 is rotated clockwise as viewed in Fig. 2, a number of signals can be coded thereon. The roller 29 pushes all the pins 28 inwardly just before the solenoids 30 push the selected ones outwardly so that there is no chance of the pins being wrongly positioned accidentally or of them retaining an "operative" position from a previous setting.

Six of the seven rows of pins 28 are used for recording characters on the drum and for recording certain functional signals. One row of pins 28 (in the arrangement shown, the top row) is used for recording the times when the shift key of the keyboard is depressed or held down to cause printing in the capital case.

It is, of course, within the purview of the invention to have any desired number of rows of pins 28 upon the code drums and to provide as many pins in any row as may be desired. Six rows of pins make it possible to have sixty-three different permutations or combinations at any one time and enable sixty-three different signals to be recorded in code. This will normally be sufficient to take care of all the characters on the keyboard as well as the functional operations of the apparatus.

Associated with the code drum 4 is mechanism for rotating it, step by step, to cause vertical lines of pins 28 to be brought successively adjacent the solenoids 30. A suitable circular rack 32 is secured to the base of the drum and suitable pawls 33 and 34 are provided to work the rack, these pawls being actuated by springs 35 and 36 under the control of solenoids 37 and 38. Thus to rotate the code drum 4 in a clockwise direction as viewed in Fig. 2, the solenoid 37 is energized which attracts the pawl 33 toward it. When the solenoid 37 is de-energized, the spring 35 causes the pawl 33 to advance the code drum one notch. Likewise, when it is desired to rotate the code drum in a counterclockwise direction as viewed in Fig. 2, the solenoid 38 is energized which causes the pawl 34 to be attracted toward it so that when the solenoid 38 is de-energized, the spring 36 rotates the drum one notch in a counterclockwise direction. Suitable clicks or detents (not shown) may be provided to hold the drum stationary while neither of the solenoids 37 nor 38 is energized.

Immediately adjacent the roller 29 on the outside of the drum 4 is a bank of switches vertically disposed, these being designated 39 and being seven in number, there being one switch for each row of pins 28. Each switch is provided with a mechanical pointer 40 located in the path of those pins 28 which may have been pushed outwardly by the solenoids 30 when the drum 4 was rotated in a clockwise direction as viewed in Fig. 2. Thus when the drum 4 is rotated in a counterclockwise direction, step by step, the pins 28 temporarily close certain of the switches 39. These switches are connected to the decoding apparatus 20 of Fig. 1 and cause certain solenoids of the decoder 20 to be energized in accordance with signals recorded upon the code drum.

Apparatus suitable for exposing film in the box 11 to print characters thereon, in the sequence desired, under the control of the decoding device 20, is shown in details in Figs. 5 to 8. As shown in Fig. 6, the font drum 13 is mounted upon a drive shaft 15 so that it rotates therewith. The drum may be moved longitudinally along the shaft, however, it being splined thereto as shown as 39.

The longitudinal position of the drum 13 upon the shaft 15 is controlled electrically by three solenoids (see circuit diagram Fig. 26) and suitable ratchet mechanism, shown generally at 18 in Fig. 1 and shown in detail in Fig. 7.

The font drum 13 per se may be made of glass, transparent synthetic resin, or some other transparent material. It is supported at one end only so as to permit a spark gap arrangement or other flashing device to be placed therein. As shown in Fig. 6, the right-hand end of the drum 13 is mounted on a spider 41 which has a collar integral therewith. A ring 42 is fitted within a groove in the collar so as to provide means for moving the drum 13 longitudinally of the shaft 15.

The ring 42 does not rotate. As shown in Fig. 7, it is provided with diametrically disposed pins 43 upon which the upper ends of a yoke 44 are connected. The yoke 44 is pivoted on the table or frame 1, as shown at 45, while its lower end is connected to the font selector block 18. Three solenoids designated 46, 47, and 48 are mounted on the block 18 and operate pawls 49, 50, and 51 against rack 52 to move the block 18 step by step in either direction. The solenoids 46, 47, and 48 are controlled by the decoding device 20 as will be explained hereinafter, so that the font drum 13 may be moved back and forth while printing, to change from one font to another, depending upon the functional signals recorded on the code drums 4 or 5.

As shown in Fig. 5, means is provided for creating an intense, instantaneous light inside the font drum 13. In the arrangement shown this consists of spark terminals 53. When a spark jumps across these terminals, light is transmitted through a concentrating lens 54 and then through one character of the stencil 14 upon the drum 13 and into the optical system 12. The flashing across the gap at the spark terminals 53 is controlled by ionizing prongs 55. Of course, the invention is not limited to this system for causing a flash of light. Any other known means, such as a flash bulb, may be used to create an intense instantaneous light, if desired.

The stencils 14 upon which the various characters appear are preferably opaque except for the characters thereon so that a "positive" print is obtained on the film in the box 11, although it is, of course, within the purview of the invention to use transparent film for the stencils 14 with opaque characters appearing thereon and obtain a "negative" on the film in the box 11. In either case, proper precautions must be taken to confine the light to the particular area of the stencil being photographed, as will readily be understood by those skilled in the photographic arts. To this end the entire drum 13, except at the stencils 14, may be coated with opaque material.

As shown in Fig. 10, the stencil films 14 may be mounted in grooves upon the drum 13 so as to be well protected. In the arrangement illustrated, corresponding characters of the three cases of a given font are displaced one hundred twenty degrees around the circumference of the drum 13. The lower case alphabet is put upon the stencil 14 with the letters nine degrees apart. The upper case alphabet is displaced from the lower case three degrees and each capital letter appears on the stencil displaced one hundred twenty degrees from the corresponding lower case letter. Thus capital "A" appears on the stencil three degrees after lower case "a." The third case is displaced three degrees from the upper case. Thus each third case character appears on the stencil two hundred forty degrees from its corresponding character of the lower case. This spacing is employed to enable the cases to be selected by the use of the three arms 60 of Fig. 8, each spaced one hundred twenty degrees, as will be explained presently.

Since the font selector 18 moves the drum 13 step by step along the shaft 15, one font or another is always between the spark terminals 53 and the optical system 12, the teeth in the rack 52 being so spaced as to bring each font into the correct position. However, with the present invention, many less than the usual number of fonts for printing are required, since it is not necessary to have different sizes of characters upon the font drum 13.

To print different sizes of characters upon film in the box 11, it is only necessary to modify the optical system 12 to create an enlarged or diminished image upon the film and to adjust the amount of linear advance or "size" of the film after each exposure. To change the optical system, means such as that shown in Fig. 5 may be provided. As there shown, various lens systems, three of which are designated 56, 57, and 58, may be employed selectively in the optical system 12, the lens systems being mounted on a block 59 for sliding movement on frame 1. Each lens system creates an image of a different size upon the film in the box 11.

To adjust the amount of linear advance of the film, or size, following each exposure, in accordance with the size of image selected for printing, the pantograph apparatus or film advancing means shown in Fig. 17 is manually adjusted by the knob 24, as explained hereinafter.

Since each font on the drum 13 contains many characters, and since the drum is rotated at perhaps 1200 r. p. m. during printing, it is necessary to have the flash of light occur at exactly the right instant to expose the film in the box 11 to the character selected for printing and to have the characters printed on the film with precision. Two different embodiments of character selectors are shown in the drawings, as illustrative or preferred constructions, but it will be understood that the invention is not necessarily limited to either of these structures. It will be understood that the function of the character selector is to cause illumination of certain characters on the front drum 13 in a sequence corresponding to that with which character keys on the keyboard 2 are struck.

Another embodiment of a character selector is disclosed in my co-pending parent application Serial No. 604,474 filed July 11, 1945, referred to above and in my co-pending application Serial No. 119,947 filed October 6, 1949, both now abandoned.

In Fig. 8, the character selector apparatus 19 of Fig. 1 is shown in some detail. The structure includes three arms 60 mounted for rotation on the shaft 15 which supports and drives the drum 13. These arms are fixed to the shaft one hundred twenty degrees apart and thus rotate with the drum.

Each arm 60 carries, at its outer end, a switch. These are designated 61, 62, and 63. They are normally closed, but break when breaker points 64 attached thereto strike one of a number of pins 65 interposed selectively in their path of travel as the arms 60 rotate. The pins 65 are equal in number to the number of characters in a single case of a font on the stencil 14. They are mounted for sliding radial movement on a circular frame 66 fixed to the table 1. The positions of the pins 65 are controlled by a number of solenoids 67 mounted on the frame 66, the solenoids being connected to the decoding device 20 and selectively energized through the decoding device. Each pin 65 is held biased outwardly in its normal or inoperative position by a spring (not shown) and moves inwardly into the path of the breaker points 64 when its solenoid is energized.

Three arms 60 are provided because each font of characters on the font drum has three cases. Thus the switch 61 may control the printing of lower case letters of an alphabet, the switch 62 control the printing of upper case or capital letters, and the switch 63 control the printing of third case characters, depending upon what functional signal is recorded on the code drums 4 or 5. The solenoids 67 select the individual characters while the switches 61, 62, and 63 select the case of characters, the switches being governed by the pins 65 which control exactly the times when they open. Since the locations of the pins 65 are fixed with respect to the table 1 and hence with respect to the spark terminals 53 and the optical system 12, the breaker points 64 will always strike the pins 65 at the right time to cause an exposure of one character only.

For precise photography, the angular position of the arms 60 with respect to the characters on the stencils 14 on the font drum and with respect to the position of the pins 65 must be accurately correlated so that only one character in one case will be in position for printing beneath the light source when one pin 65 is selected and when one of the circuits of the switches 61, 62, and 63 is selected.

As mentioned above in connection with the stencil 14 shown in Fig. 10, corresponding characters in different cases are spaced 120 degrees. This is to enable the arms 60 to be spaced 120 degrees and thus be in proper dynamic balance. It is convenient to employ forty characters in each case and space them nine degrees apart around the circle. If then the arms 60 are spaced by one hundred twenty degrees, it is evident that there are thirteen lower case characters subtended on the circle between any two arms 60, with three degrees (or one-third of the distance between two lower case characters) left over. Since the corresponding characters of the different cases are spaced one hundred twenty degrees on the font drum, the proper character will be in position for photographing, this being true even though the pins 65 are stationary. For example, if it be assumed that the pin 65 which causes the printing of the letter "a" is at the top of the circle of pins shown in Fig. 8, then when the breaker point 64 of the switch 61 comes up to the top, the lower case of the letter "a" on the font drum 13 must be over the optical system 12 in position to be photographed. When the breaker point 64 of the switch 62 arrives at the top of the circle of pins 65, the upper case letter "A" on the font drum must be over the optical system in position to be photographed. The same relative positions between pin 65, breaker points and characters on the font drum must be maintained for the other characters and for the third case.

It will be observed that all three of the switches 61, 62 and 63 are opened, one after the other, as the arms 60 rotate and bring the breaker points 64 into engagement with any pin 65 which happens tto be depressed into "operative" position. Only one of the switches will cause the light to flash, however, because the switches are connected into the flashing circuit only one at a time, as will be explained hereinafter in describing the circuit of Fig. 23.

The modified form of character selector shown in Fig. 9 differs from that of Fig. 8 in that photoelectric responsive means is employed. Instead of the solenoids 67 and pins 65, a number of small lamp bulbs 68 are mounted radially on a stationary frame, these being shielded from each other by partitions 69. Apertures 70 are made in a cylindrical shield 71 so that when any lamp is energized a beam of light will pass to the interior of the shield 71. The lamps 68 may be connected to the decoding device, so that only one lamp will be illuminated at a time.

Instead of three arms being mounted on the shaft 15, in the embodiment shown in Fig. 9 only one arm 72 is fixed upon the shaft. Loosely mounted on the shaft 15 is a bracket 73 which carries a photoelectric cell 74. The bracket 74 is held in one of three positions with respect to the arm 72 by a solenoid 75 and two electromagnets 76 and 77. The armature of the solenoid 76 is spring-pressed radially inwardly. Unless the solenoid is energized the armature engages a seat 78 on the arm 72 to hold the bracket 73 in the central position with respect to the arm.

Electromagnet 76, when energized (solenoid 75 being energized at the same time), angularly displaces the bracket 73 slightly to the right of the arm 72, as viewed in Fig. 9, while electromagnet 77 displaces it slightly to the left. Thus the photoelectric cell 74 is adjusted to three positions with respect to any character on the font drum, it being understood that the arm 72 is fixed with respect to the characters on the font drum. This provides ready means for selecting the case of a given font. The spark flashes to print a character on film in the box 11 when the photoelectric cell 74 passes by an aperture 71 adjacent a lamp 68 which has been energized, the photoelectric cell being in a circuit which controls the flashing as explained hereinafter in connection with the diagram of Fig. 25. If this kind of character and case selector is employed the corresponding characters of the different cases will be adjacent to each other on the stencil 14 rather than as shown in Fig. 10. If the corresponding characters are spaced three degrees on the stencil, the design should be such that the magnets 76 and 77 move the bracket 73 three degrees from the central position with respect to the arm 72, thus providing three stops three degrees apart.

Figs. 11, 12, and 13 show some of the details of the decoding device 20. On each of the code drums 4 and 5 of Fig. 1, there are six rows of pins 28 used for recording characters or functional signals (the seventh row of pins 28 on each drum being used to signal a shift from lower to upper case and not having any effect upon the decoding device). Therefore, there are six bars in the decoding device which are actuated in accordance with the pins 28 of the code drums. These bars are designated 79 in Fig. 11. They are mounted for sliding longitudinal movement on the base 20 of the decoding device, being individually biased in one direction by springs which are shown at 80 in Fig. 11. Each bar 79 is actuated by a solenoid 81 which pulls it in the opposite direction to that of the springs 80 when the solenoid is energized. Since the bars 79 are close together, for convenience in illustration only two of the solenoids 81 are shown in Fig. 11, but it will be understood that six are employed, one for each bar 79, and that they are offset from the bars 79 for ease of assembly. The circuits for the solenoids are shown in Fig. 23.

Each bar 79 has its upper edge notched as shown in Fig. 13 to provide a number of wards 82. In accordance with known lock technique, the wards 82 in each bar 79 are different and are such that when any combination of solenoids are energized the notches between the wards will be aligned at only one point along the bars.

A number of tumblers 83 are mounted at right angles to the ward bars 79. These tumblers 83 are ordinary smooth blades. Each has one end pivoted on the base 20, as shown at 84 in Fig. 12. The tumblers 83 are individually pulled downwardly by springs, one of which is shown at 86a in Fig. 12. Normally the tumblers 83 ride upon the ward bars 79, one tumbler, and one only, falling into the aligned notches on the bars 79 when electrical current is supplied to those solenoids 81 which make up any desired combination. There are as many tumblers 83 as there are characters on the keyboard and in addition there are several for carrying on functional operations necessary for printing, such as for the selection of fonts and for shifting to and from the third case of any font as described hereinafter. For convenience in illustration, only a few of the tumblers are shown in Fig. 11, however.

If all of the tumblers 83 were riding the ward bars 79, it would be difficult to move the ward bars. For this reason, means is provided for lifting all the tumblers temporarily as the selected solenoids 81 are energized and then letting them fall just before the solenoids are de-energized. The lifting means may consist of a pair of solenoids 85 designed to lift a rod 86 extending underneath all of the tumblers. The operation of the solenoids 85 will be more apparent from the description of the circuit diagrams of Figs. 23 and 24.

Each tumbler 83 is designed to close an electric switch when it falls into notches in the ward bars 79. The contacts of the switches are shown at 87 in Figs. 11 and 12, these being mounted upon an insulating block 88. The circuits in which these switches 87 are included are shown in Fig. 23. As explained hereinafter, these circuits control the action of the character selector and also control the mechanism which sizes or advances the film in the box 11 as characters are printed on the film.

An important feature of the present invention is the mechanism employed for causing a justified line to be printed on the film in the box 11. As a necessary part of the justifying mechanism, some means must be provided for counting and adding the widths of the characters which compose the line to be printed so that this sum can be subtracted from the total width of the line to find the total space which is to be justified. The difference may be referred to as the line shortage. It is the total space which must be split up among and added to the spaces in a line of composition to justify the line. The justifying means is associated with the film advancing means in such a way that after it measures the line shortage and counts the number of spaces in the line of composition, it controls the film advancing means at the time the latter makes the space advances, according to the calculations. In the copending application, Serial No. 604,474, filed July 11, 1945, one form of mechanism is disclosed for counting and adding the widths of the characters. In Figs. 14, 15, and 16 of the drawings accompanying this specification, a different form of counting and adding mechanism is disclosed. Those skilled in the art will realize that other known forms of counting mechanism may be employed and the invention should not be regarded as limited either to the form shown herein or to that shown in the copending application.

As shown in Fig. 14, the counting and adding mechanism may be mounted on the frame 89 which supports the keyboard 2. As explained above, there is associated with the keyboard a typewriter carriage which carries a platen 6 upon which characters may be typed so that the compositor can visualize what is being coded upon the drums 4 and 5. In Fig. 14, the carriage for the platen 6 is designated 90. The counting mechanism is designed to move an electrical contact 115 in accordance with the widths of the characters on the keyboard 2 which are struck. After a number of the keys on the keyboard have been struck and after the space key on the keyboard has been struck several times, the mechanism is such that the contact 115 will have moved a distance proportional to the sum of the widths of the various characters. It does not move at all when the space key is struck. However, with the mechanism shown in Figs. 14, 15, and 16, the carriage 90 upon which the platen 6 is mounted moves a small distance when the space key is struck so that the compositor can readily see where spaces appear in the line which he is composing.

In accordance with the usual typewriter construction, the carriage 90 for the platen is biased to slide in one direction under the influence of a spring 91. The view of the mechanism shown in Fig. 14 is from the rear of the typewriter so that the carriage 90 is biased to move to the right as shown in this figure.

The carriage 90 is provided with a rack 92, the teeth of which are enmeshed with a pinion 93 which is connected through a ratchet 94 to the escapement wheel 8. Thus the carriage cannot move to the right as viewed in Fig. 14 unless the escapement wheel 8 rotates.

The escapement wheel 8 can move only short distances of varying amounts as various keys on the keyboard are struck. Each time any key is struck, whether it be a character key or the space key, a solenoid 95 (Fig. 15) is energized and oscillates an escapement bar 96 which is pivoted upon a shaft 97 mounted on the frame 89. The upper end of the bar 96 carries two segments of gear wheels, one of which is designated 98 and the other 99, these being mounted on opposite sides of the bar 96 and being pivoted thereon by means of a pin 100. The gear teeth of one or the other of the segments 98 and 99 are in engagement with the teeth on the escapement wheel 8 at all times, but as the bar 96 is rocked back and forth, the segments 98 and 99 alternately clutch the escapement wheel 8.

As shown in Fig. 16, the segment 99 is mounted for limited rotation upon the pin 100, the amount of rotation being controlled by a stop 101 fixed to the bar 96 and located in a slot 102 in the lower portion of the segment 99. A spring 103 connected between the bar 96 and the spring 103 tends to rotate the segment 99 counterclockwise as viewed in Fig. 16. The spring 103 is, of course, much weaker than the spring 91 which moves the carriage 90. Thus whenever the segment 99 is brought into clutching engagement with the escapement wheel 8, the escapement wheel 8 rotates in a clockwise direction as viewed in Fig. 14 (or in a counterclockwise direction as viewed in Fig. 16) so that the segment 99 rotates in a clockwise direction as viewed in Fig. 16 until the stop 101 strikes the opposite end of the slot 102 from the position in which it is shown in Fig. 16. This will allow the carriage to advance a predetermined amount, say five units of width, depending upon the size of the slot 102. If the space key on the keyboard 2 is struck no movement of the carriage 90 is permitted other than that just described, the segment 98 being held stationary with respect to the arm 96 when the space key of the keyboard is struck. However, if a character key of the keyboard is struck, the carriage is permitted to advance an additional amount under the control of the segment 98. The segment 98 is provided with a pointer 104, the lower end of which wipes across an arcuate member 105 provided with a number of stop pins 106 mounted unit distances apart. Sufficient stops 106 may be provided to permit the carriage 90 to advance any distance from five to twenty units. Each of the stops 106 is under the control of a solenoid, one of which is shown at 107 in Fig. 15. One of these solenoids is energized whenever either a character key or the space key of the keyboard is struck. As will be explained more fully hereinafter in connection with the circuit diagram of Fig. 21, when the space key is struck, the stop 106 nearest the pointer 104 is interposed in its path so that the pointer cannot then move across the arcuate member 105, thus retaining only the five units of movement allowed by slot 102 of segment 99.

The segment 99 is normally in clutching engagement with the escapement wheel 8. When the solenoid 95 is energized, the segment 98 is brought into engagement with the wheel 8 and the segment 99 rotates upon pin 100 back into the position shown in Fig. 16. When the solenoid 95 is de-energized, the segment 99 engages the wheel 8 again and allows the wheel 8 to advance slightly under the control of the stop 101 as explained above. During this rocking of the bar 96, it will be seen that the spring 91 causes the carriage 90 to move to the right and acting through the escapement wheel 8 tends to cause the segment 98 to rotate in a counterclockwise direction as viewed in Fig. 14. The carriage 90 advances a certain number of units depending upon the size of the slot 102 and an additional number of units depending upon which pin 106 stops the arm 104. After the solenoid 95 is de-energized the arm 96 is rocked back to its normal position by spring 109. A spring 108 then brings the segment 98 back into the position shown in Fig. 14.

The mechanism just described causes the carriage 90 to advance whenever either a character key or the space key is struck. The electrical contact 115 is carried by the carriage 90. However, the contact 115 should not advance with respect to the typewriter frame 89 when the space key is struck. To cause contact 115 to remain stationary with respect to the frame 89 when the space key is struck, mechanism is provided for advancing it to the left on a carriage 90 (as viewed in Fig. 14) the same amount that the carriage advances to the right when the space key is struck. The contact 115 is fixed upon a rack 110 slidably mounted upon the carriage frame 90 and urged to the right by a spring 111. The rack 110 is held and advanced to the left by pawls 112 and 113, pawl 113 being controlled by a solenoid 114. When the solenoid 114 is energized, pawl 113 is brought into engagement with the next tooth to the one in which it is seated; and when the solenoid 114 is de-energized, a spring (not shown) moves the pawl 113 with respect to the carriage frame 90 the width of one tooth on the rack 110. The pawl 112 merely holds the rack 110 while the pawl 113 is being actuated. Whenever it is desired to release both pawls 112 and 113 to permit the rack 110 to return to its starting position, the solenoid 116 is energized, thus lifting both pawls 112 and 113. The circuits for the solenoids 114 and 116 are shown in Fig. 21.

It is necessary to have the contact 115 on the typewriter carriage in the correct position in order for the justifying mechanism to work correctly. In Fig. 17 the justifying mechanism is shown somewhat diagrammatically.

The justifying mechanism 9 includes a carriage 117 which can be slid forward and then back on the table 1 when desired by a reversible electric motor 118 mounted on the table 1. The motor drives a small pinion 119 which enmeshes with a rack 120 secured to the carriage 117. The carriage 117 carries a triangle consisting of three bars, to-wit, a longitudinal extending bar 121 fixed to the carriage 117, a bar 122 which constitutes the hypotenuse of the triangle and which is pivoted on the forward end of the bar 121 as shown at 123 and a rack bar 124. The rack bar 124 with the two pawls 125 and 126 constitute ratchet mechanism for swinging the bar 122 about its pivot point 123. A coil spring 127 tends to move the bar 122 to the left as viewed in Fig. 17 while the pawls 125 and 126 move the bar 122 to the right when they are actuated. The pawls are mounted on the carriage 117 and cause the rack 124 to travel to the right. The rack 124 is provided with a small roller 129 which engages the bar 122. A solenoid 130 is connected to the pawl 125 to move it to the left. A spring (not shown) pulls the pawl 125 back to the right to advance the rack 124 when the solenoid 130 is de-energized, this action advancing the bar 122 to the right. The pawl 126 serves to hold the rack 124 while the pawl 125 is being actuated. When it is desired to release both pawls 125 and 126, a solenoid 131 is energized, this serving to lift both of the pawls off of the rack 124.

It will be observed that the rack 124 always travels at right angles to the bar 121. In other words, it has tangential movement with respect to the angle formed by the bars 121 and 122 at the pivot point 123. This tangential distance which the rack 124 moves subtends the angle mentioned.

At its rear end, the bar 121 is provided with a wedge bar 132 which is rigidly attached to it. The bar 132 constitutes an inclined plane which engages a pointer 133 on the justifying block 10. The block 10 is adapted to slide back and forth upon a guideway 134. It is urged to the left by a spring 135. As explained above, block 10 is used to provide a justifying space when a line of characters and spaces is being printed upon film in the box 11. It is moved to the right as viewed in Fig. 17 by the wedge bar 132 when the electric motor 118 drives the carriage 117 forward. Since the carriage 117 has the bars 121 and 122 mounted upon it, these bars move when the carriage moves. The extent of the forward motion of the carriage 117 depends upon the angular position of the bar 122 and upon the position of the contact 115 on the typewriter carriage. As soon as the bar 122 strikes the contact 115, forward motion of the carriage 117 stops. This is accomplished by the electrical control mechanism described hereinafter in connection with the circuit diagram of Fig. 21. The extent of forward motion of the carriage 117 determines how far the block 10 is moved to the right by the wedge bar 132. As soon as the block 10 is moved to the right as far as the wedge bar 132 forces it, an electromagnet 136 is energized. The top of table 1 is made of iron so that when the electromagnet 136 is energized, a magnetic circuit is provided between the core of the electromagnet and the table top so that the block 10 is held stationary. The magnetic circuit is best shown in Fig. 18. The electromagnet 136 remains energized during the printing of an entire line on film in the box 11. It is then de-energized so that the spring 135 can move the block 10 back to its starting position. Before the next line is printed on film in the box 11, the justification mechanism is again actuated to reset the block 10.

Within the box 11 is a carriage 137 mounted for sliding movement to the left or to the right. The carriage 137 is urged to the right by a spring 138 and it is moved to the left by the sizing mechanism as will be explained presently. The carriage 137 carries the film (not shown) upon which characters are to be printed. A platen for the film is shown at 139, this platen preferably being provided with cogs 140, uniformly spaced to match holes in the film, so that the film is geared to the platen 139. Ratchet mechanism 141 rotates the platen 139 step by step when a solenoid 142 is energized.

The carriage 137 is moved to the left by suitable film advancing or film sizing means. The carriage 137 and the film are moved variable amounts depending on the sequence with which character keys or the space key on the keyboard 2 are struck, these advances being under the control of the justifying means already described. The film advancing means includes an electromagnetic clutch or "grab." For this purpose, the right end of the link 143 has an electromagnet 144 mounted thereon. A stationary electromagnet 145 is mounted on the table 1.

The electromagnets 144 and 145 constitute what may be called an electromagnetic ratchet, the steps of which are infinitely variable. They are alternately energized under the control of timer 21 (see circuit diagram Fig. 24. When the electromagnet 145 is energized, it prevents the carriage 137 from moving, the base of the carriage 137 being made of iron. When the electromagnet 144 is energized, the carriage 137 is magnetically attached or clutched to the link 143 so that when this link is moved to the left the carriage 137 moves with it. In order to avoid any slippage, the circuits to these electromagnets are such that one is energized just before the other is de-energized. When it is desired to release the carriage 137 so that it can move back to the right or starting position, both electromagnets are de-energized.

The left-hand end of the link 143 is connected to a compound lever system which constitutes a special form of pantograph. This includes two levers 146 and 147. The rear end of the lever 146 is pivoted upon the table 1 as shown at 149, while the rear end of the lever 147 is pivotally connected as shown at 150 to the link 143 which actuates the carriage 137. The forward end of the lever 147 is pivoted to the table as shown at 148. Spaced pins 151 held a fixed distance apart by the bar 152 are provided for the levers 146 and 147. The bar 152 is guided by the traveling rider 153 on the screw 154. The rider 153 holds the bar 152 at right angles to the axis of the screw 154 at all times. Thus the pins 151 can be moved back and forth along the levers 146 and 147 as the screw 154 is turned by the knob 24. These pins, with the bar 152, serve to transmit motion from the lever 146 to the lever 147 and hence to the link 143.

Hence the link 143 is moved back and forth a certain amount when the lever 146 is oscillated. The lever 146 is moved by a cam 155 which is part of the timer mechanism 21 shown in Fig. 1 and which is driven by an electric motor 22. The cam 155 causes its rider 156 to move back and forth. Extending outwardly to the left of the rider 156 is a link 157 loosely connected to the lever 146 as shown at 158. The link 157 is provided with a small head 159 which is guided within the rider 156. A coil spring 160 is connected between the head 159 and the rider 156 as illustrated in Fig. 17. The mechanism is such that as the cam 155 rotates there is a tendency for the lever 146 to move likewise. However, if the lever 146 is held stationary, the spring 160 is merely expanded so that the rider 156 then moves back and forth without the lever 146 moving. In other words, a flexible drive through the spring 160 is provided between the cam 155 and the lever 146. The amount of motion imparted by lever 146 to lever 147 depends upon the position of the bar 152 adjusted by the screw 154. Thus means is provided for varying, at will, the ratio of motions of levers 146 and 147, so that the step by step advances of the carriage 137 can be made large or small to accommodate different sizes of characters being printed on film on the carriage. It will be understood that with the screw 154 set at any given position, the magnitude of the step by step advances of the carriage 137 will vary depending upon variations in widths of individual characters of the same size of type.

The amount which the lever 146 is permitted to move each time that the cam 155 rotates is controlled either by a stop on the justifying block 10 or by one of a number of stops on the sizing control mechanism 23 mentioned above in connection with the apparatus of Fig. 1. The forward end of the lever 146 is connected to a rack 161. As shown in Fig. 18, there is a small projection 162 secured to the top side of the rack 161. Ordinarily the rack may slide back and forth beneath the block 10. However, there is mounted for vertical movement on the block 10 a small pin 163 which is depressed by a solenoid 164. When the solenoid is energized the pin 163 is interposed in the path of the projection 162 and causes the rack 161 to stop its motion, thus also stopping motion of the levers 146 and 147. As explained hereinafter in connection with the circuit diagram of Fig. 23, the solenoid 164 is energized when a justified space is to appear in the line of composition being photographed on the film in the box 11. The position of the pin 163 when the solenoid 164 is energized, depends upon the setting of the block 10 by the justifying mechanism in the manner set forth above. The pin 163 may thus be referred to as an adjustable stop for controlling the printing device to vary uniformly the magnitude of the spaces between certain of the characters, as between words, when a line of characters is being printed.

When a character is being photographed on film in the box 11, the position of the block 10 has nothing to do with movement of the levers 146 and 147. Their movement is then controlled by the sizing mechanism 23. As shown in Fig. 17, a small pinion 165 is in mesh with the rack 161 at all times. The shaft 166 upon which the pinion 165 is secured extends through the top of the table 1 and is part of the sizing mechanism 23 which is shown in detail in Figs. 19 and 20. The shaft 166 carries a pointer 167 which swings around the body of the sizing mechanism 23 as the rack 161 is moved back and forth. A number of pins 168 are arranged in a circle concentric with the shaft 166. Each of these pins is controlled by a solenoid 169. When any solenoid 169 is energized, one of the pins 168 is interposed in the path of the pointer 167. Preferably there are sixteen pins 168 so that the motion of the carriage 137 can be controlled any number of units from five to twenty units. The circuits for the solenoids 169 appears in Fig. 23. When any solenoid is energized, the pin 168 which it controls regulates the amount of travel of the film carriage 137 in the box 11. The amount of travel of the carriage 137 is not necessarily the same as the amount of travel of the rack 161, but the two movements are proportional, the ratio being controlled by the screw 154 and the knob 24 which regulates the amount of magnification of the pantograph system as explained above.

The electrical system, which includes the coding and decoding mechanism already described, is provided for transmitting signals from the keyboard 2 to the character selector and to the film advancing means. As shown in Fig. 1 of the drawing, this system includes an electrical switching arrangement beneath the keyboard as shown generally at 3. Various switching arrangements may be used. In my copending application, Serial No. 604,474, filed July 11, 1945, a photoelectric arrangement is disclosed for controlling electrical circuits selectively depending upon which keys on the keyboard are struck. In one form of the invention actually reduced to practice, a number of bus bars were provided with a number of small wells filled with mercury into which electrical contacts dipped to make the desired connections, the contacts being carried by the levers upon which the keys were mounted. This serves to illustrate that more than one form of switching arrangement may be employed.

In the circuit diagrams of Figs. 21 and 22 of the accompanying drawings, small push-button switches are illustrated as being actuated by the keys of the keyboard 2. Details of their construction are not given since various kinds are well known. It should be mentioned, however, that in some of the operations it is necessary that the switches remain closed for a fraction of a second to allow certain parts to operate.

In Fig. 21 only a few of the keys of the keyboard 2 are shown, there being only enough to illustrate how movement of the typewriter carriage is controlled when a character key is struck in any one of the three cases and illustrating how the electrical contact 115 is controlled and how the justification mechanism operates when the space key of the keyboard is struck. It will be apparent to those skilled in the art that the other character keys on the keyboard operate in a similar way to control movement of the carriage, each character key having its own separate circuits to certain of the solenoids 107 of the typewriter sizing mechanism 8 shown in Fig. 15.

In Fig. 21, a character key is shown at 170 alongside of the space key 171. A shift key 172 shifts from the lower to the upper case and two keys 173 and 174 control shifting to the third case, the key 173 being used to select the third case and the key 174 being used to discontinue the third case and return the system to the lower case. In this figure, the keys are diagrammatically illustrated as being viewed from the rear of the typewriter. A fragment of the typewriter carriage is shown at 99 and it will be understood that the carriage moves to the right, as here viewed, as a line of characters is being composed.

Beneath all the character keys 170 of the keyboard and also beneath the space key 171, there is a bar 175 which is depressed when any of these keys is struck. The bar 175 closes a switch 176 connected to the solenoid 95 which rocks the escapement bar 96 as described above in connection with Figs. 14, 15, and 16. The circuit to energize the solenoid 95 is from the battery 177 through the solenoid 95 and the switch 176 to ground.

It was explained in connection with Fig. 14 that when the space key of the keyboard is struck, the pointer 104 of the typewriter sizing mechanism does not move. To accomplish this, a switch 178 is closed by the space key 171. This closes a circuit through the first solenoid 107 on the arcuate member 105, the circuit being from the battery 177 through the solenoid 107 and the switch 178 to ground.

When the character key 170 is struck, the switch 179 closes the circuit of one or another of the sizing solenoids 107 depending upon which case has been selected. If none of the keys 172, 173, or 174 has been depressed, the lower case has been selected. Current can then flow from the battery 177 through the particular solenoid 107, which is adapted to the required lower case size for that character, for example, that designated 107a in Fig. 21. The circuit is from the battery 177 through solenoid 107a to the normally closed back contact 180 of relay 181, thence to the normally closed back contact 182 of relay 183 and the switch 179 to ground.

If the shift key 172 is held depressed while character key 170 is struck, the solenoid 107b is energized instead of solenoid 107a. When shift key 172 is depressed, relay 181 is energized, the circuit being from battery 184 through the relay 181 and the switch 185 to ground. This shifts the blade of relay 181 to the front contact 186. The circuit for solenoid 107b is then from the battery 177 through the solenoid 107b, the front contact 186 of relay 181, the back contact 182 of relay 183 and the switch 179 to ground.

If the third case key 173 is depressed, the relay 183 is energized, the circuit being from battery 187 through the relay 183 and the switch 188 to ground. The relay 183 is provided with a blade 189 which then closes against its front contact 190. The blade 189 is connected through normally closed back contact 191 of a holding relay 192 for the relay 183. Thus when switch 188 is closed, relay 183 remains energized until holding relay 192 is energized, the holding circuit being from battery 187 through relay 183, back contact 191 of relay 192, blade 189 and contact 190 to ground. Relay 192 is energized when key 174 is depressed to close switch 193.

As long as relay 183 is energized, the third case is selected for sizing. In Fig. 21, this is indicated by the solenoid 107c. Current flows from the battery 177 through the solenoid 107c, the front contact 194 of relay 183 and the switch 179 to ground.

In addition to the typewriter sizing circuit, Fig. 21 shows the circuit of the justifying mechanism. When the space key 171 is struck and the switch 178 closed, the ratchet 110 which carries the contact 115 moves to the left. This is accomplished by energizing the solenoid 114. The circuit is from the battery 194 through the solenoid 114 and the wire 195 to the switch 178 to ground.

At the same time that the solenoid 114 is energized, the solenoid 130 is energized so that the justification bar 122 is moved one tooth to the left on the ratchet 124. The circuit for the solenoid 130 is from the battery 224 through the solenoid 130, the wire 195 to the switch 178 to ground.

After a line has been composed, if the compositor sees that no error has been made therein, he presses the justification key 196. This closes a switch 197 connected to a wire 198. This energizes relay 199, the circuit being from a battery 200 through the relay 199, the normally closed back contact 201 of a holding relay 202, the wire 198 and switch 197 to ground. The relay 199 remains energized until holding relay 202 is energized by the justification bar 122 moving into engagement with contact 115, the bar 122 being grounded as shown at 203. The circuit for relay 202 is from battery 204 through the relay 202, the contact 115 and the bar 122 to ground. When relay 202 is energized the holding circuit for relay 199 is broken at 201, the holding circuit being from the battery 200 through the relay 199, the back contact 201, and the blade 205 and front contact 206 of relay 199 to ground.

Relay 199 has three blades. Blade 205 is for the holding circuit as just described. The other two are designated 207 and 208. The blade 207 is in the circuit which controls the electromagnet 136 on the block 10. The circuit to this magnet is normally closed, being from a battery 209 through the coil of the electromagnet 136 and the normally closed back contact 210 of the blade 207 to ground. Whenever relay 199 is energized this circuit is broken at 210. Thus for the short period of time after the justification key 196 is depressed and before the bar 122 strikes the contact 115, the magnet 136 is not energized and the block 10 is free to move under the influence of the spring 135 of Fig. 17 or in the opposite direction under the influence of the wedge bar 132. The instant the relay 199 is de-energized, which takes place when the bar 122 strikes contact 115, the electromagnet 136 is again energized and the block 10 is locked in position until the justification key is again depressed.

The blade 208 of relay 199 has a front contact 211 and a back contact 212, the latter being normally closed. The back contact 212 is connected to a reversing relay 213, in circuit with a battery 214 and a limit switch 215 held open normally by the carriage 117 of the justifying mechanism. Thus, even though the back contact 212 is normally closed, the relay 213 is not energized until after the carriage 117 has started its forward motion. Likewise, so long as relay 199 is energized, relay 213 is not energized even though the limit switch 215 is closed. It is only when the carriage 117 is not at its rearward position and only when the relay 199 is de-energized that the relay 213 is energized.

The electric motor 118 which drives the justification mechanism forward and back is a reversible motor and as such has two field coils 216 and 217. It may also be provided with a suitable brake controlled by a coil 118a in series with it.

When the coil 216 of the motor 118 is in circuit the motor drives the carriage 117 forward. When the coil 217 is in circuit the motor 118 drives the carriage 117 back. As soon as the justification key 196 is depressed and the relay 199 is energized, the circuit to the motor 118 is closed through coil 216. Current flows from the battery 218 through the magnetic brake coil 118a, through the armature of the motor and its coil 216, front contact 211 of relay 199 and blade 208 to ground.

When the carriage 117 has gone forward far enough to bring bar 122 into engagement with contact 115, the relay 199 is de-energized as explained above and the motor circuit is broken at 211. The reversing relay 213 is then energized. This relay may be so designed as to have a slight time delay before moving its blade, if desired. In any event, the relay 213 closes the motor circuit through the coil 217. Current flows from the battery 218 through the brake coil 118a and through the armature of the motor 118, the coil 217 and the contact 219 to ground. This circuit remains closed until the carriage 117 opens the limit switch 215. The relay 213 is then de-energized and the motor circuit broken at 219.

As explained above, the justification mechanism serves the purpose of moving the block 10 the correct distance to cause it to control the printing of a justified line when the characters of the line composed are being printed in the box 11. After the mechanism has served this purpose, the ratchets thereof must be reset. This may be done automatically. In the diagram of Fig. 21, a shaft 220 carrying two cranks 221 and 222, is shown associated with the typewriter carriage 90. When the carriage 90 is brought back to the left, as viewed in this figure, to start the composition of a new line, it strikes the crank 221 which rotates the shaft 220 and causes the crank 222 to close a switch 223. This energizes solenoids 116 and 131. The circuit for the solenoid 116 is from the battery 194 through the solenoid 116, the wire 225 to the switch 223 and ground. The circuit for the solenoid 131 is from the battery 224 through the solenoid 131, the wire 225 and the switch 223 to the ground.

Should an error in the selection of characters or spaces be discovered either during or at the end of the composition of a line, an error key 246 (shown in Figs. 22 and 23 but not shown in Fig. 21) is held depressed while the carriage 90 is brought back to the starting position. The error key serves no function in the justification mechanism, however. Resetting the typewriter carriage automatically resets the ratchets in the justification mechanism. When an error has been made the composition of the line must start anew.

Fig. 22 is a circuit diagram of the electrical apparatus which records upon the code drums 4 and 5 the sequence with which characters are struck upon the keyboard 2 as well as recording certain functional operations upon the drums 4 and 5. Certain of the keys of the keyboard are illustrated. In this figure the view is taken from the front of the keyboard. As in Fig. 21, only one character key is illustrated. It will be understood that the other character keys have similar circuits, each circuit being different so that only the code for the particular character key struck is coded upon the code drums.

In the system illustrated, the switch 179 beneath the character key 170 is connected in the circuit of a relay 227. This particular relay has three blades 228. It will be understood that some of the relays 227 for some of the other characters may have more blades or less but in no case over six unless more than six rows of pins 28 are provided on the code drums for recording character signals. For use with all of the relays 227, a number of bus bars 229 are provided. In the arrangement illustrated for the particular character key under consideration, the contacts of the relay 227 are connected to the second, third and sixth of the bus bars 229. Thus when the character key 170 is depressed, the relay 227 is energized and the bars to which the contacts of that relay are connected are grounded through the blades 228.

Associated with the code drums 4 and 5 is a two-position snap gang relay 230 for switching from one code drum to the other. This gang relay is provided with eight blades designated 231. The upper of these blades 231 is not connected to the bus bars 229. It is connected through a wire 232 to a switch 233 in series with the switch 185 beneath the shift key 172. The switch 233 is operated by a bar 234 which extends all the way across the keyboard beneath the character keys, the space key 171, and the functional keys designated 173, 174, 235, 236, and 237. It will be observed that the bar 234 does not extend beneath the lever of the shift key 172, however. The upper blade 231 of the gang relay 230 is grounded only when the switch 233 is closed. To accomplish this, it is necessary to depress the shift key 172 and then strike one of the character keys 170.

All of the blades 231 of the gang relay 230 except the upper one and the lower one are connected to the bus bars 229. Thus if the blades 231 are snapped to the left as viewed in Fig. 22, the bus bar 229 will be connected to six of the solenoids 30 of the left code drum 4, while if the blades 231 are snapped to the right these bus bars will be connected to six of the solenoids 30 of the right code drum 5.

Thus signals can be recorded on the code drums alternately. The selection of signals recorded depends upon which of the bus bars 229 are grounded. Some of the bus bars 229 are grounded whenever a relay 227 is energized. A relay 227 is energized whenever a character key 170 is struck. One or more of the bus bars 229 are grounded whenever one or more of the functional keys or the space key 171 is struck.

The lower blade 231 of the gang relay 230 is employed for energizing one of the solenoids 37 of the code drums which rotate them step by step. The lower blade 231 is connected to a battery 238 which may be grounded through a blade 239 actuated by a relay 240. The relay 240 is in circuit with a battery 241 and a switch 242 which is closed when the bar 234 is depressed. Thus each time a character key 170 or the space key 171 or any of the functional keys of the keyboard are struck, one of the solenoids 37 will be energized and advance the pawl 33 one notch so that when the solenoid 37 is de-energized, the spring 35 of Fig. 2 can advance the code drum one position.

The gang relay 230 does not snap the blades 231 during the recording of signals until the entire line of composition has been completed. Relay 230 is energized when the typewriter carriage 90 is brought back to the position for starting the composition of a new line, this mechanism including the levers 221 and 222 described above in connection with Fig. 21. When the carriage 90 strikes the lever 221, a switch 250 (not to be confused with the switch 223 of Fig. 21) is closed and the relay 230 energized. It will be observed that the circuit for the relay 230 is from a battery 243 through the switch 250, the relay 230, a wire 244, and a normally closed switch 245 to ground. The switch 245 is controlled by an error key 246 which is depressed when an error has been made. If the error key 246 is depressed, the circuit for the gang relay 230 cannot be closed. Thus when the carriage 90 is brought back to starting position with the key 246 held depressed, the blades 231 of the gang relay are not moved upon the resetting of the carriage, and the code drums are not switched.

As the typewriter carriage 90 is brought back to starting position, the particular code drum to which the blades 231 are then connected, is advancing one step if the error key 246 is depressed and the coding upon the same code drum then continues. To advance the code drum one step under these conditions, a normally open switch 247 is also actuated by the error key 246. This grounds the relay 240 which moves the blade 239 thus energizing the solenoids 37 as explained above.

In Fig. 23, there are shown the circuits for the decoding device, the character selector, the film sizing mechanism and the system for causing the light to flash. These circuits are partially under the control of the timer 21 of Fig. 1, but the action is initiated by movement of the typewriter carriage 90 which closes the switch 250. The switch 250 performs two functions. As explained in connection with Fig. 22, the closing of switch 250 by the carriage 90 causes a switching of code drums. In addition, the closing of this switch 250 automatically starts the decoding of the drum upon which signals have just previously been recorded.

As shown in Fig. 23, the switch 250 is connected to a two-way snap relay 248 which has a blade 249 connected to the timer 21. (The connection is to the strip A of the timer of Fig. 24.) The purpose of the timer 21 is to ground certain circuits in the proper sequence. When the timer 21 grounds the blade 249, electrical current is supplied from battery 254 to one or the other of the solenoids 38 which cause rotation of the code drums 4 or 5 in a counterclockwise direction as viewed in Fig. 2, depending upon the position of the blade 249 which moves from one position to the other each time relay 248 is energized. Except when an error is being corrected, relay 248 is energized each time the carriage 90 is brought back to starting position, the circuit being from the battery 243 through the switch 250 and the relay 248 to ground through the error switch 245. Of course, if the error button 246 is held depressed, the blade 249 does not move, for the circuit through the relay 248 is not then closed.

The code drums do not move when their solenoids 38 are energized. Each solenoid 38 merely retracts a pawl 34. When the solenoid 38 is de-energized, the spring 36 of Fig. 2 advances the code drum one step in a counterclockwise direction. Thus the arrangement is such that the code drum advances only after the pins 28 thereof actuate the switches 39 to govern the solenoids 81 of the decoding device.

Since the code drums are rotated counterclockwise (as viewed in Fig. 2), only one at a time, it is not necessary to switch them alternately to the decoding device. Only the switches 39 of one of the code drums at a time can cause the solenoids 81 of the decoding device to be energized. The solenoids 81 will move certain of the ward bars 79 depending upon which of the switches 39 are closed as the code drum moves from one position to the next, the switches 39 being under the control of the pins 28 of the code drums as shown in Fig. 2. The circuit of each solenoid 81 is from the battery 251 through a switch 39 and one of the solenoids 81 to ground.

The upper switch 39 of each code drum functions to control the shifting from lower to upper case. Hence the wire 252 from the upper switches 39 of the two code drums does not pass to the decoding device. The wire 252 is connected to one of the coils 253 of a three-way relay, one of the blades of which is in the flashing circuit as will be described presently.

As explained in connection with Fig. 12, coils 85 are provided to lift all the tumblers 83 as soon as any one has served its purpose of closing one of the switches 87 beneath it. The coils 85 are shown in Fig. 23. They are connected to the timer as indicated in Fig. 24.

Only certain of the tumblers 83 of the decoding device of Fig. 11 control the printing of characters. Others serve to cause certain functional operations to be performed and one operates in response to a "space" signal recorded on the code drums. In Fig. 23 some of the tumblers are indicated. Those tumblers which serve to decode regular character signals are marked 83 in Fig. 23, while those which are for some special purpose are designated 83a, 83b, and 83c. Tumblers 83a and 83b control the functional operation of shifting to the third case and back.

Tumbler 83c controls the spacing between words or the like in printing the characters which compose the line. Its circuit is very simple. Whenever this tumbler falls, its switch causes the solenoid 164 on the block 10 (see Figs. 17 and 18) to be energized. As described above, this controls the advance of the carriage 137 in the box 11 for a justified space.

It will be understood that there are as many regular tumblers 83 as there are characters to be printed in any one case. Each of the regular tumblers 83 has a circuit like that of the three here shown but differing therefrom in the particular connections to the solenoids 169 of the film sizing mechanism 23 and the solenoids 67 of the character selector 19.

Whenever a character tumbler 83 falls, its switch 87 performs two functions. It controls the energizing of a particular solenoid 67 of the character selector 19 and it controls the energizing of a particular solenoid 169 of the film sizing mechanism 23. The circuit for the solenoids 67 (only three of which are shown connected in Fig. 23) is from the battery 255 through a switch 87 closed by one of the tumblers 83 and thence through the solenoid 67 to ground.

In order to select a character for printing, the solenoids 67 of the character selector must remain energized long enough to permit the arms 60 (Fig. 8) to make at least one complete revolution. A selected tumbler 83 thus remains down to close its switch 87 for a major portion of the rotation of the cylinder of the timer 21. The font drum 13 and hence the arms 60 should rotate twice as fast as the timer 21 so as to be sure that the switches 61, 62, and 63 of the firing circuit are opened at least once before the selected tumbler 83 is lifted to open its switch 87.

As soon as switch 61, 62, or 63, whichever one happens to be in the flash circuit at the time, strikes the pin 65 of the character selector which has been depressed by one of solenoids 67, a light is flashed and an exposure made to print one of the characters of the font drum upon film in the box 11.

The particular case of the character printed is determined by which of the switches 61, 62, and 63 is connected into the firing circuit. As shown in Fig. 23, the connections to these switches are brought out of the character selector through suitable slip rings 256 and are connected to three contacts 257, 258, and 259 adjacent the upper blade 260 of a gang switch actuated by relay coils 253 and 261. The central contact 257 is the one with which the blade 260 is normally engaged. Hence when neither of the relay coils 253 or 261 is energized, the blade 260 is connected to the switch 61. As here shown, the switch 61 controls the printing of lower case characters.

When the upper case characters are to be printed, the relay coil 253 is energized (the circuit being through the wire 252 as explained above) and the blade 260 is moved thereby into engagement with the contact 258. This connects the switch 62 instead of the switch 61 into the firing circuit.

When the third case characters are to be printed, the relay coil 261 is energized instead of the coil 253 and the blade 260 is caused to engage contact 259 to connect switch 63 into the firing circuit. The relay coil 261 is held energized by the decoding device as long as the third case is selected. As mentioned above, the tumblers 83a and 83b control the third case. Tumbler 83b starts the use of the third case and tumbler 83a stops it. When a signal comes from a code drum which causes tumbler 83b to fall, its switch 87 energizes relay 262, the circuit being from battery 255 through the switch 87 beneath tumbler 83b, the normally closed back contact 263 of relay 264 and the relay 262 to ground. When relay 262 is thus energized, a circuit is closed from a battery 265 through contact 266 to the relay coil 261.

A holding circuit for this connection is provided by means of a holding contact 267 on the relay 262. The holding circuit is from battery 255 through the contacts 267, the contact 263 of relay 264 and the relay 262 to ground.

The third case is held for printing until tumbler 83a falls. This energizes relay 264, the circuit being from battery 255 through the switch 87 beneath tumbler 83a and the relay 264 to ground. When relay 264 is energized, the holding circuit is broken at 263 and the system returns to the lower case position.

This system is also used to control the film sizing mechanism as will be described hereinafter.

The flashing circuit is shown in Fig. 23. In the arrangement shown, high voltage from a source 268 is available to charge condenser 279 and apply a potential across the spark terminals 53 all during the operation of the system but a flash does not occur until the air in the gap is ionized. The source 268 serves to charge the condenser 279. If the supply mains are alternating current, a transformer may be used in connection with the source 268, and a power rectifier may be employed as disclosed in my parent application Serial No. 604,474. Ionization is brought about by the prongs 55. A very high direct current voltage pulse is supplied to the prongs 55 through a thermionic tube 269 which functions as a relay but which is much faster than the electromagnetic relays used elsewhere in the system. The tube 269 may be a thyratron or other gas filled tube using a grid for controlling starting of an electrical discharge. The grid of the tube 269 is connected through a resistance 270 to the blade 260 by a wire 271. A battery 272 connected to the grid through a resistance 273 places a negative bias on the grid of the tube 269 as long as the wire 271 is grounded, the voltage of the bias being the IR drop across resistance 270. When wire 271 is not grounded by one of the switches 61, 62, or 63 as described above, and the negative bias on the grid is removed, the tube 269 "fires," the circuit being from the "B" battery 274 through resistance 275 and the tube 269 to ground at its cathode. The battery 274 is also connected through a resistance 276 to the wire 271. When the tube fires this disturbs the charge normally maintained on a condenser 277 by the battery 274 so that the condenser discharges setting up a large pulse in the primary of transformer 278, the circuit of the condenser through the primary of transformer 278 to ground being shunted by the tube 269. The secondary of transformer 278 is connected to the prongs 55 so that when a pulse occurs in its primary a high voltage is impressed on the prongs 55, thus ionizing the air in the vicinity of the prongs.

It will be observed that the prongs 55 are ionized upon the "breaking" of the ground of wire 271. Any time this grounding circuit is broken the tube 269 will fire. Hence the contacts 257, 258, and 259 for the blade 260 must be so designed that one "makes" before the other "breaks" in order to avoid false firing of the tube 269 in switching from one case to the other.

Certain other safety precautions should be taken, one convenient system being shown in Fig. 23 in connection with the flash circuit. As shown, the flash circuit from the source 268 to the spark terminals 53 includes a condenser 279 and a very high resistance 280 connected in parallel and a resistance 281 connected in series with the gap. The condenser 279 discharges across the gap 53 when the air is ionized by the prongs 55. Since it takes a small but appreciable interval of time for the condenser to charge again, the flash is brilliant but of extremely short duration.

The safety circuit consists of means for keeping the prongs 55 grounded at all times except for the instant during which the condenser 279 discharges across the gap 53. A relay 282 has one of its terminals connected through a battery 283 to strip C of the timer 21 of Fig. 24. Its other terminal is connected by a wire 284 to a switch 285 controlled by a bar 286 which extends all along beneath the regular character tumblers 83 but not beneath the special tumblers such as 83a, 83b, or 83c.

Except when the relay 282 is energized, the prongs 55 are grounded through its normally closed back contact 287. Even if the tube 269 fires under these conditions, there will be no flash of light at the terminals 53 because the secondary of transformer 278 will then discharge through the contact 287.

The relay 282 is energized when a character tumbler 83 is down and when the strip C of timer 21 is grounded. It remains energized until a spark jumps across the gap 53. This operation is brought about by a holding circuit for the relay 282 controlled by a relay 288 in series with the gap 53. The holding circuit is from a battery 283 through a contact 291 of relay 282 to ground through the normally closed back contact 290 of relay 288. When the gap 53 is not ionized, no appreciable current is flowing in the flash circuit. When the gap is ionized and the spark jumps the gap, the relay 288 is temporarily energized and the holding circuit is broken at 290 thus causing the prongs 55 to be grounded at 287. The ground cannot again be removed until the timer 21 makes another revolution to again ground its strip C. Thus the spark can jump only once for each revolution of the timer 21.

The circuits of Fig. 23 described above show how the flashing is caused to occur to print the proper characters. Fig. 23 also shows how the film sizing mechanism 23 is controlled for either of the three cases. For any of the three cases, a circuit is provided from the switch 87 of one of the character bars 83 to one of the blades 292 of the gang switch actuated by the relay coils 253 and 261. Each of these blades has three positions. Their normal position is in engagement with the contacts 293 which control the film sizing for lower case characters. When the relay coil 253 is energized, the blades 292 engage the contacts 294 which control the film sizing for upper case characters. When the relay coil 261 is energized, the blades 292 engage the contacts 295 which control the film sizing for third case characters. The contacts 293, 294, and 295 are connected to certain of the solenoids 169 of the film sizing mechanism 23, the particular solenoid 169 depending upon the particular size of the character and case. In Fig. 23 only three blades 292 are shown because only three character tumblers 83 are shown. In the actual apparatus, there must be as many blades 292 as there are characters in any given case. Since many of these characters will be of the same width, however, there need be only perhaps sixteen solenoids 169 to regulate the advance of the film carriage from five to twenty units. Some of the connections from the contacts similar to those designated 293, 294, and 295 are accordingly made to the same solenoid.

Of course, several smaller three-position switches may be employed instead of the gang switch shown at 292—295, provided the contact coils are connected in parallel. Whether many switches are employed or only one gang switch is used as illustrated, it will be understood that the control coils shift them into either upper case or third case when desired. As shown in Fig. 23, the same control coils 253 and 261 are used to shift the blades 294 and the blade 260 in the firing circuit. This also is a matter of convenience or choice and separate coil systems may be used to perform these functions.

Referring back to Fig. 22 again, it will be seen that five "functional" keys are shown, these being designated 173, 174, 235, 236, and 237. It has been explained that keys 173 and 174 may be employed to shift into and out of the third case for controlling movement of the typewriter carriage as shown in Fig. 21. Functional keys 173 and 174 also cause signals to be recorded on one of the code drums 4 or 5 as illustrated in Fig. 22. These signals control the tumblers 83b and 83a of the decoding device, as shown in Fig. 23, to shift into and out of the third case while printing.

Functional keys 235, 236, and 237 may be used to control other functional operations by recording signals on the code drum which cause certain functional tumblers of the decoding device to fall. It will be understood that more than five functions can be performed by these five functional keys. Since they may be struck in various combinations, theoretically as many as thirty-one functional operations may be performed. That many are not required, however. The chief operations which have to be signalled are the shifting of the font drum as shown in Fig. 26 and the starting and stopping of the printing of a line as shown in Fig. 24. The tumblers shown in these figures are under the control of the functional keys of the keyboard.

In Fig. 24 the circuit diagram shows how certain functional tumblers, designated 83d and 83e, control the starting and stopping of the printing of a line of characters. As has been pointed out, certain of the devices of Fig. 23 are connected to the timer 21. The connections to this timer, or time-sequence switch, are shown in Fig. 24. The strips designated A, B, C, D, and E of timer 21 are segments of metallic rings on an insulating cylinder as shown in Fig. 17. They are rotated at a convenient speed, say six hundred R. P. M. Brushes 301 are provided to wipe these strips or segments and ground the same when called upon to do so by the falling of tumblers 83d and 83e.

It should be noted that the cam 155 shown in Fig. 17, which actuates the pantograph levers and thus moves the film carriage 137, is on the same shaft as the timer 21. Hence the movement of the carriage 137 is correlated with the closing of the circuits controlled by the timer.

The connections of the strips of the timer 21 are as follows:

Strip A is connected to the blade 249 of the relay 248 of Fig. 23. This causes one of the code drums to be advanced one step for each rotation of the timer.

Strip B is connected to the solenoids 85 of the decoding device of Fig. 23. This lifts the tumblers 83 and permits the solenoids 81 to move the ward bars 79 each time that the timer rotates. It will be observed that strip B is longer than strip A. This permits the selected ward bars 79 to move upon the closing of the selected switches 39 before the tumblers fall.

Strip C is connected to the relay 282 in the flashing circuit of Fig. 23. This should be a short strip. It removes the ground from the ionizing prongs 55 so that the flash circuit is ready to expose a character when the tube 269 fires.

Strip D is connected to the holding magnet 145 associated with the film carriage 137 as shown in Fig. 17.

Strip E is connected to the advancing magnet 144 associated with the film carriage 137 as shown in Fig. 17.

Thus when the brushes 301 are grounded, certain steps are caused to be performed in a certain sequence by the timer 21. It may be assumed that the strips are moving to the right as indicated by the arrow. At the start all of the tumblers 83 are up so that the switches 87 are all open. As strip A is grounded the code drum is advanced to place a new signal on the decoding device, the tumblers being held up at that time by grounding strip B. One tumbler then falls so that the character selector and the film sizing mechanism are set for the new signal. The flashing circuit is then put in its "ready" position by grounding the strip C. The exposure is then made by breaking one of the switches 61, 62, or 63 and the film is then advanced the proper distance by the alternate grounding of strips D and E.

Certain precautions must be taken to avoid errors. The printing of a line must not start before the justifying mechanism of Fig. 21 has completed its cycle and the printing must stop when the line is completed. This is taken care of by the relays in the circuit which grounds the brushes 301.

When the tumbler 83e falls to start the printing of a line, it closes its switch 87. If a limit switch 302 on the justifying mechanism is closed, relay 303 is energized and the circuit to relay 304 is closed through contact 305 of relay 303. As long as relay 304 is energized, the brushes 301 are grounded at 306 through contact 307. Relay 304 is provided with a holding circuit which is controlled by relay 308 which is energized only when tumbler 83d falls. The holding circuit is from the battery 309 through the relay 304, the front contact 310 of relay 304 and the normally closed back contact 311 of relay 308.

Since the falling of tumbler 83d brings the printing of a line to an end, the relay 308 may be used to rotate the film platen 139 of Fig. 17 one step. Thus a front contact 312 is provided on this relay and connected to the solenoid 142 which rotates the platen 139.

The limit switch 302 on the justifying mechanism should not be confused with the limit switch 215 shown in Fig. 21. Switch 302 of Fig. 24 is open during the time that the carriage 117 of the justification mechanism is in motion. It is held closed by the carriage 117 after the carriage has moved forward and back.

The font selector circuit is shown in Fig. 26. As shown, the solenoid 51 is in series with one or the other of the solenoids 49 or 50 when either of the tumblers 83f or 83g falls. If the tumbler 83f falls, current flows from the battery 313 through the solenoid 51, the solenoid 49 and to ground through the switch 87 closed by tumbler 83f. If tumbler 83g falls, current flows from the battery 313 through the solenoid 51, the solenoid 50 and to ground through the switch 87 closed by the tumbler 83g. The plunger 314 controlled by the solenoid 51 holds the font selector in position accurately during printing. It is raised by solenoid 51 to permit ease of shifting by solenoids 49 and 50. It will thus be seen that the operator can choose which font of characters on the font drum 13 is to be illuminated and this font can be employed during all or any part of the line of composition, the operations of the font selector being transmitted through the coding and decoding devices of the electrical transmitting system.

In Fig. 25, a modified form of flashing circuit is shown. This is the circuit of the character selector shown in Fig. 9 in which a photoelectric cell 74 is employed to energize the flashing circuit. As shown in Fig. 25, the cell 74 is connected through one of the slip rings 319 to the grid of a tube 315. When the cell 74 is rendered conductive by light striking it from one of the lamp bulbs 68 (controlled exactly the same as the solenoids 67 of Fig. 23), the negative bias placed upon the grid of the tube 315 by the battery 316 is reduced and the plate current of tube 315 is increased. Tube 315 is resistance coupled to a thyratron tube 269, the plate of which is connected to the condenser 277. The thyratron tube 269 and the flash circuit are the same, and function the same, as the parts correspondingly designated in Fig. 23 and the description need not be repeated here.

To shift the character selector from lower to upper case or to the third case, the coils 75, 76, and 77 of the apparatus of Fig. 9 are connected as shown in Fig. 25, the solenoid 75 being in series with either the coil of electromagnet 76 or the coil of electromagnet 77 depending upon which is energized. Through suitable slip rings 319, the coils of electromagnets 76 and 77 may be energized. The electromagnet 76 may control the shifting to the upper case and be connected directly to the wire 252 of Fig. 23 which is connected to the upper switch 39 of the code drums. The electromagnet 77 may control the shifting to the third case and be connected directly to the contact 266 of Fig. 23 controlled by the tumblers 83b and 83a of the decoding device.

Many variations may be made from the arrangements herein disclosed without departing from the spirit of the invention. For example, the case selecting system of Figs. 9 and 25 could be used instead of that shown in Figs. 8 and 23 even though a make and break switch like that shown at 61 were retained. Likewise three photoelectric cells like that shown at 74 in Fig. 9 might be used in place of the switches 61, 62, and 63 on the three arms 60 of Fig. 8. Any number of similar changes might be made by those skilled in the art and the invention should not be regarded as limited except by the scope of the annexed claims.

I claim:

1. In apparatus adapted for photographic printing upon light-sensitive film or the like of a line of characters with spaces between certain of the characters, said apparatus including a keyboard having character keys and a space key and a device for printing characters on the film in accordance with the manner in which the character keys and the space key of the keyboard are struck, that improvement which consists in the provision of justifying mechanism having a stop associated with said printing device for causing the line printed thereby to be justified, said justifying mechanism including a movable electrical contact mounted for movement in a given direction along a straight line, means for advancing said contact each time a character key is struck in composing the line, in an amount proportional to the width of that character, a right-angle triangle member mounted for movement in a straight line at right angles to the direction of movement of said contact and so disposed that the hypotenuse of said triangle member may engage said contact, means for changing the position of said hypotenuse of said triangle member in a unit tangential amount each time the space key is struck in composing the line and means for controlling the position of said stop in accordance with the magnitude of travel of said triangle member before the hypotenuse thereof engages said contact, the arrangement being such that said triangle member travels a distance in direct proportion to the difference between the total width of the line and the sum of the widths of the characters which compose the line and in inverse proportion to the number of times the space key is struck in composing the line.

2. In apparatus adapted for photographic printing upon light-sensitive film or the like of a line of characters with spaces between certain of the characters, the combination of a keyboard having character keys and a space key, a code recording device for recording temporarily the sequence of characters and spaces struck upon the keyboard in composing the line, a device for printing characters on the film in the sequence recorded by said code recording device and justifying mechanism having a stop associated with said printing device for causing the line printed thereby to be justified, said justifying mechanism including a movable contact, means for advancing said contact each time a character key on the keyboard is struck in composing the line in an amount proportional to the width of that character, a right-angle triangle member mounted for movement along such a path that the hypotenuse of said triangle member crosses the path of said contact, means for raising one end of the hypotenuse of said triangle member a unit tangential distance each time the space key on the keyboard is struck in composing the line and means for controlling the position of said stop in accordance with the magnitude of travel of said triangle member before the hypotenuse thereof engages said contact, the arrangement being such that said triangle member travels a distance in direct proportion to the difference between the total width of the line and the sum of the widths of the characters which compose the line and in inverse proportion to the number of times the space key is struck in composing the line.

3. In apparatus adapted for printing a line of characters with spaces between certain of the characters, the combination of a keyboard having character keys and a space key, a code recording device for recording temporarily the sequence of characters and spaces struck upon the keyboard in composing the line, a device for printing characters in the sequence recorded by said code recording device and justifying mechanism for causing the line printed thereby to be justified, said justifying mechanism including a stop associated with said printing device, a contact with means for moving the same in a given direction as character keys upon the keyboard are struck in composing the line, a member mounted for sliding movement at right angles to the direction of movement of said contact and having an arm pivoted thereon with means for rotating said arm a unit tangential distance each time the space key is struck in composing the line, said arm being so arranged that when the member slides said arm engages said contact and means for controlling the position of said stop in accordance with the magnitude of travel of said member before said arm engages said contact.

4. In apparatus adapted for printing a line of characters with spaces between certain of the characters, the combination of a keyboard having character keys and a space key, a code recording device for recording temporarily the sequence of characters and spaces struck upon the keyboard in composing the line, a device for printing characters in the sequence recorded by said code recording device and justifying mechanism for causing the line printed thereby to be justified, said justifying mechanism including a stop associated with said printing device, a contact with means for moving the same as keys of the keyboard are struck in composing the line until said contact is in a position indicative of the total amount of space to be justified in the line, a member movable with respect to said contact and having a pivoted element thereon adapted to engage the contact, means for rotating said element a unit tangenial distance each time the space key on said keyboard is struck in composing the line and means for controlling the position of said stop in accordance with the magnitude of travel of said member necessary to cause said element to engage said contact.

5. Photographic composing apparatus for producing justified lines of composition, comprising a manual keyboard and means for displaying characters of written matter, said keyobard having a space key, counting means associated with the keyboard for determining the number of times the space key is struck during the composing of a line of characters and interword spaces of said written matter, a register for storing information corresponding to a line of characters and interword spaces of said written matter, a character carrier comprising a rigid continuously rotatable member on which characters of different widths are displayed at uniform distances from the axis of rotation, means for supporting a sensitized sheet having provision for advancing the sheet for line spacing, projection apparatus for projecting characters from said character carrier on to the sensitized sheet, advancing means to cause the characters to be projected to successive portions of the sheet, an intermittent discharge tube having a discharge time which is short in comparison with the time of passage of a character past the projection apparatus, a discharge control circuit for the tube, switches controlled by the register for operating the discharge control circuit to energize the tube to successively project selected characters on the sensitized sheet, mechanism controlled by the register for controlling said advancing means in accordance with the character widths, adding means for determining the sum of the widths of all the characters in the line of composition, mechanism responsive to said adding means and to said counting means for determining the widths of the interword spaces, and means controlled by said register for determining the position of said interword spaces between the several words to effect the required justification.

6. A photographic composing machine for printing justified lines of composition by illuminating characters in a desired sequence, including, in combination, a rotatable carrier bearing characters of different widths arranged in a circle, means for rotating said carrier about the axis of said circle continuously during operation of the machine, a light source for illuminating by flash one character at a time to produce an image of each such character, the flash being short compared to the passage of a character past the light source, a photographic film, means for printing characters on the film by imparting thereto a latent image of each character illuminated on the carrier, a character selector associated with the carrier for causing the desired operation of said light source, advancing means operable during the continuous rotation of said carrier for effecting relative movement in variable amounts between the film and the character images depending upon the widths of the character images imparted thereto and upon the widths of the spaces required to justify a given line of composition, a keyboard having character keys and a space key, a signal recording system for making a temporary record of the sequence of characters and spaces struck upon the keyboard while a sufficient number are being struck to fill that line of composition, operative connections between said signal recording system and said character selector for effecting the desired sequence of character illumination and for regulating said advancing means in accordance with the individual character widths, adding means to determine the sum of all the character widths in that line of composition, counting means to determine the number of spaces in that line of composition, and means controlled by the temporary record made by said signal recording system and controlled by said adding means and said counting means for regulating said advancing means to effect the required justification.

References Cited in the file of this patent

UNITED STATES PATENTS

| Number | Name | Date |
|---|---|---|
| 581,815 | Eaton | May 4, 1897 |
| 1,603,953 | Hunter | Oct. 19, 1926 |
| 1,647,408 | Hunter | Nov. 1, 1927 |
| 1,732,049 | Hunter | Oct. 15, 1929 |
| 1,933,650 | Bascom | Nov. 7, 1933 |
| 2,168,886 | Roberts | Aug. 8, 1939 |
| 2,177,539 | Roberts | Oct. 24, 1939 |
| 2,178,379 | Spievak | Oct. 31, 1939 |
| 2,178,380 | Spievak | Oct. 31, 1939 |
| 2,207,265 | Ogden | July 9, 1940 |
| 2,211,320 | Efron | Aug. 13, 1940 |
| 2,229,689 | Westover | Jan. 28, 1941 |
| 2,229,690 | Westover | Jan. 28, 1941 |
| 2,231,924 | Koller | Feb. 18, 1941 |
| 2,240,938 | McNaney | May 6, 1941 |
| 2,261,538 | Brand | Nov. 4, 1941 |
| 2,264,615 | Bryce | Dec. 2, 1941 |
| 2,278,993 | Johnson | Apr. 7, 1942 |
| 2,295,000 | Morse | Sept 8, 1942 |
| 2,298,666 | Whitelaw | Oct. 13, 1942 |
| 2,351,126 | Highton | June 13, 1944 |
| 2,356,620 | Schade | Aug. 22, 1944 |
| 2,369,431 | Bryce | Feb. 13, 1945 |
| 2,377,801 | Mills et al. | June 5, 1945 |
| 2,379,862 | Bush | July 10, 1945 |
| 2,395,659 | Freund | Feb. 26, 1946 |
| 2,402,750 | Huebner | June 25, 1946 |
| 2,408,754 | Bush | Oct. 8, 1946 |
| 2,432,527 | Lang | Dec. 16, 1947 |
| 2,441,899 | Ogden | May 18, 1948 |
| 2,475,497 | Harrold et al. | July 5, 1949 |